(12) United States Patent
Piccionelli

(10) Patent No.: US 12,453,356 B2
(45) Date of Patent: *Oct. 28, 2025

(54) CONDUCTOR AND MEMBER INTERACTIVE DECORATION

(71) Applicant: Gregory A. Piccionelli, Westlake Village, CA (US)

(72) Inventor: Gregory A. Piccionelli, Westlake Village, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/892,103

(22) Filed: Aug. 21, 2022

(65) Prior Publication Data

US 2023/0232518 A1    Jul. 20, 2023

Related U.S. Application Data

(60) Provisional application No. 63/235,607, filed on Aug. 20, 2021.

(51) Int. Cl.
| | |
|---|---|
| *A21D 13/47* | (2017.01) |
| *A23G 3/34* | (2006.01) |
| *A47G 33/08* | (2006.01) |
| *F21V 35/00* | (2006.01) |
| *H05B 47/155* | (2020.01) |
| *H05B 47/165* | (2020.01) |
| *H05B 47/19* | (2020.01) |
| *H04L 67/125* | (2022.01) |
| *H04W 4/80* | (2018.01) |

(52) U.S. Cl.
CPC ........... *A21D 13/47* (2017.01); *A23G 3/0097* (2013.01); *A47G 33/0818* (2013.01); *F21V 35/003* (2013.01); *H05B 47/155* (2020.01); *H05B 47/165* (2020.01); *H05B 47/19* (2020.01); *A47G 2033/0827* (2013.01); *H04L 67/125* (2013.01); *H04W 4/80* (2018.02)

(58) Field of Classification Search
CPC ...... A21D 13/47; A23G 3/0097; A23G 3/563; A47G 33/0818; A47G 2033/0827; F21V 35/003; F21V 33/0052; F21V 33/0056; F21V 23/0442; F21V 23/045; F21V 35/00; H05B 47/155; H05B 47/165; H05B 47/19; H04L 67/125; H04W 4/80; F21S 9/02; F21W 2121/00; F21Y 2113/10; F21Y 2115/10

See application file for complete search history.

(56) References Cited

U.S. PATENT DOCUMENTS

| | | | | |
|---|---|---|---|---|
| 2001/0028227 | A1* | 10/2001 | Lys | G09G 3/32 |
| | | | | 315/368.23 |
| 2010/0226617 | A1* | 9/2010 | Piccionelli | A47G 33/08 |
| | | | | 345/2.1 |
| 2016/0053978 | A1* | 2/2016 | Wang | H05B 45/20 |
| | | | | 362/628 |
| 2020/0401366 | A1* | 12/2020 | Beaumier | G06F 3/0485 |
| 2021/0211038 | A1* | 7/2021 | Healy | H03F 3/68 |
| 2021/0361105 | A1* | 11/2021 | Piccionelli | H05B 47/175 |

* cited by examiner

*Primary Examiner* — Sahlu Okebato
(74) *Attorney, Agent, or Firm* — Gregory B. Gulliver

(57) ABSTRACT

A holiday or event decoration that is able to synchronize media shows between multiple devices.

5 Claims, 14 Drawing Sheets

CONDUCTOR AND MEMBER INTERACTIVE DECORATION

RELATED PATENTS

This application claims priority to U.S. Provisional Patent Application 63/235,607, titled "CONDUCTOR AND MEMBER INTERACTIVE DECORATION filed on Aug. 20, 2021, all of which are incorporated by reference herein. The full texts of U.S. Pat. Nos. 7,248,230, 8,462,079, 10,540,019, 9,652,114, 9,996,170, 10,438,448, 10,739,817, 11,199,913, 11,232,679, U.S. patent application Ser. No. 17/549,852, U.S. patent application Ser. No. 17/590,574, U.S. patent application Ser. No. 12/932,883, and U.S. patent application Ser. No. 15/188,920 (referred to hereinafter collectively as "Inventor's Patent Documents" or "IPDs") are all incorporated by reference and included herein as though each and all are set forth in full herein.

TECHNICAL FIELD

The present invention generally relates to interactive holiday declarations and, more particularly, to coordinated interactive holiday displays.

BACKGROUND

Traditional decorations and ornaments for holidays, such as Christmas, Hanukkah, Halloween, Valentine's Day, Birthdays, and Anniversaries are static and meant to express memories of symbols of the holiday. Typically, the traditional ornaments are static or limited in their ability to play media. Some ornaments have been made that can play a video or audio, but they are limited to stand-alone devices. If multiple devices are used, the audio is not synchronized and/or the video is not synchronized during performances, resulting in a chaos of noise and lights.

What is needed is a device and approach that overcomes the problem stated above.

SUMMARY

An interactive decoration processor controlled that is networkable and able to coordinate the playing of media between multiple devices.

Other devices, apparatus, systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
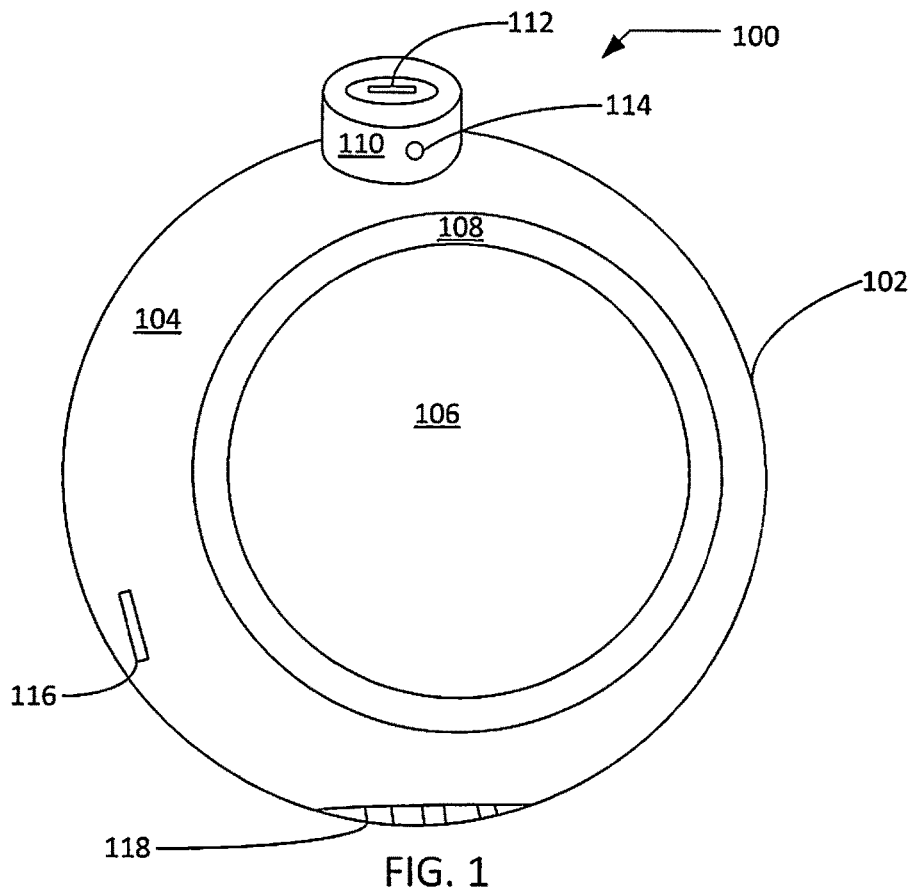
FIG. 1 is an illustration of an interactive ornamental processor-controlled device in accordance with an example implementation.

In FIG. 1, an illustration 100 of an interactive ornamental processor-controlled device (sometimes also referred to as "IOPCD", "Ornament", "IOPCD Ornament" or "G.A.P.man Ornament") 102 in accordance with an example implementation is depicted. In some preferred embodiments the IOPCD 102 has an enclosure 104 with a display 106 surrounded by a ring 108. The enclosure 104 may have a protrusion 110 that houses a network interface 112 and camera 114. The IOPCD 102 may also have a memory interface 116 and speaker grill or opening 118 in enclosure 104. The enclosure may be composed of plastic, metal, wood, or other materials able to support and hold the display 106 and other components. In other implementations, a combination of materials may be used. The enclosure may be opaque or clear depending upon the material and implementation or a combination of opaque and clear. Further, the enclosure may be formed by milling, 3D printing, molding, or cutting.

The ring 108 may be made out of similar material as the enclosure 104 and surround the display 106. The ring 108 may be detachable and replaceable, providing different colors, shapes, designs, and messaging.

In yet other implementations, enclosure 104 may be in other shapes besides globe-shaped, such as a cube, spherical, or another shape including, without limitation, shapes described in U.S. Pat. No. 7,248,230 and/or U.S. Pat. No. 8,462,079. The size of enclosure 104 is four and one quarter inches in diameter in the current implementation and able to hang on a Christmas tree. In other implementations, enclosure 104 may be larger or smaller depending upon implementation.

The display 106 may be a LED, OLED, LCD, or known display technology that can convert digital image data into visually perceptible data. The shape of the display may be round, square, rectangle, curved, or flat depending upon the implementation. In the current implementation, a round OLED display is preferred. In some preferred embodiments a plurality of displays are used. In some embodiments one or more flexible displays comprise a part or substantially all of the outer facing surface of the IOPCD.

In some preferred embodiment that include a memory interface, the memory interface is a memory slot 116 that accepts a memory module, such as an S.D. memory card, micro S.D. memory card, compact flash, Memory Stick, or other memory modules depending upon implementation. In some implementations, the memory slot 116 may have a cover or plug. Similarly, network interface 112 accepts a wired network cord that may enable data communication and power. When not in use, the network interface 112 may be covered by a cover or plug. The network protocol used by the network interface may be a two-wire, three-wire, serial, parallel, ethernet, or other known protocol depending upon implementation. The network interface 112 enables the communication between IOPCD 102 and other IOPCDs and a programming device such as a personal computer or smartphone. Internally, the IOPCD may have wireless networking capabilities, such as 802.11 or other types of wireless internet In some preferred embodiments the Ornament includes onboard SSID or similar memory.

In some preferred embodiments, the IOPCD 102 is depicted with a camera 114 that can capture still and video images. The images may be displayed upon display 106 locally or remotely on other IOPCDs and devices. The camera is similar to imagers found in smartphones. But, in other implementations, the images may be larger, such as those found in digital SLR cameras. In some preferred embodiments the IOPCD includes a plurality of cameras. In further such embodiments the plurality of cameras are arrayed in a configuration that enables capture of "surround" photographic or videographic data which can be played on or in association with immersive virtual reality ("VR") and/or augmented reality ("AR") display devices.

In some preferred embodiments, the IOPCD 102 also has a speaker grill 118 under which is a speaker that enables audio sounds to be played. The speaker below the grill 118 may be an electromagnetic, piezoelectric speaker, a transducer placed against the enclosure 104 or other appropriate sound generation device capable of reproducing recorded sound content. The preferred speaker in the current implementation is the electromagnetic speaker. In some preferred embodiments the IOPCD includes a plurality of speakers. In some further embodiments one or more speakers or sound generating devices are disposed in the IOPCD so as to use the IOPCD body as a reverberating or sound generating component.

Figure 2:
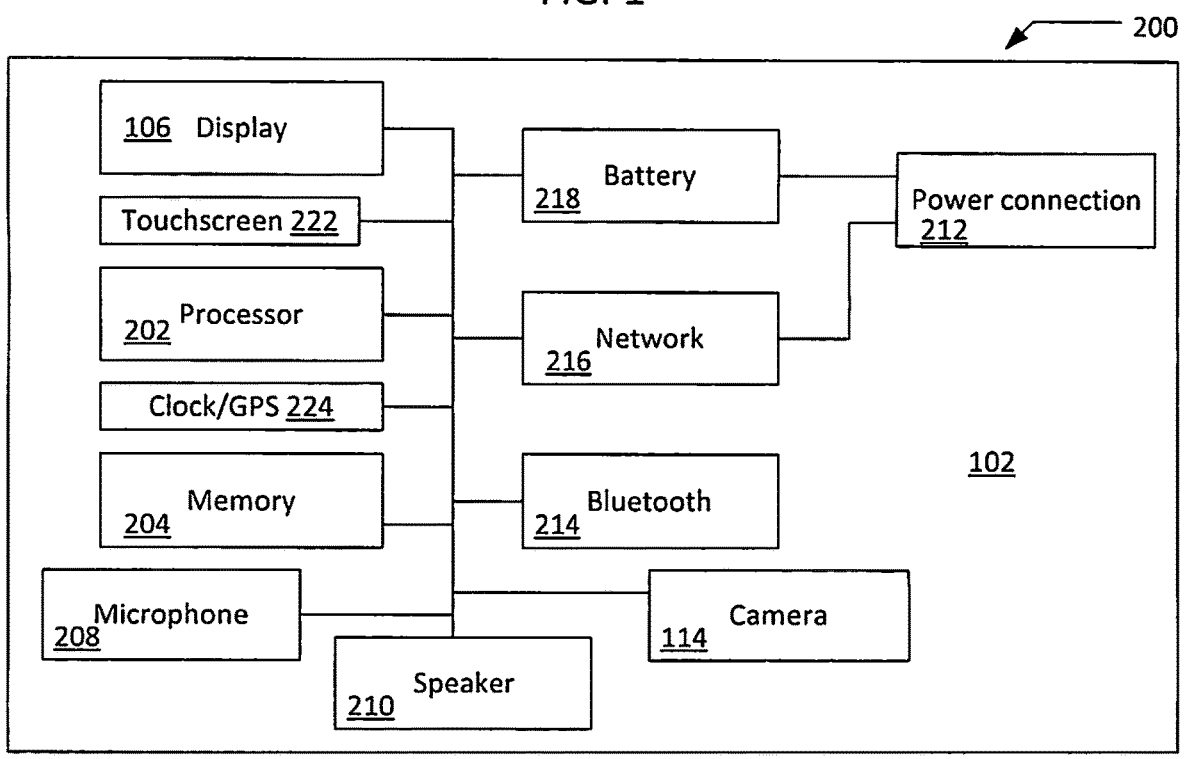
FIG. 2 is an illustration of a block diagram of the components in the interactive ornamental processor-controlled device of FIG. 1 in accordance with an example implementation.

Turning to FIG. 2, an illustration of a block diagram 200 of the components in the IOPCD 102 of FIG. 1 in accordance with an example implementation. A processor 202 is coupled to a display 106, memory 204, microphone 208, speaker 210, camera 114, Bluetooth 214, network 216, battery/power supply 218, being coupled together via bus 220. Bus 220 is depicted as a single bus, but in practice, maybe multiple buses that include data and power buses. The network 216 and batter/power supply 218 may be coupled to the network interface 212 depending upon the implementation.

The processor 202 is a controller and maybe one or more microprocessor, embedded controller, microcontroller, signal processor digital logic circuits functioning as a state machine, analog circuits functioning as a state machine, or a combination of the embedded controller, microcontroller, signal processor digital logic circuits functioning as a state machine, analog circuits functioning as a state machine. The processor 202 executes instructions, processes data, and coordinates the hardware and software modules that make up the IOPCD 102.

The memory 204 may be divided between program memory and data memory and stored in random access memory (RAM), read-only memory (ROM), or a combination of RAM and ROM memory. External memory may be coupled to bus 220 and inserted into the IOPCD 102 via slot 116 in enclosure 104. In some implementations, digital media content may be loaded and/or accessed via the coupling of external memory with the processor 202. In some preferred implementations digital media content may be loaded and/or accessed via the coupling of external memory with the processor 202 by wireless means.

Network 216 and Bluetooth 214 are typically implemented in one or more silicon chips that may be referred to as a chipset. The exact version of the networking protocol is dependent upon implementation. In yet other implementations, 3GPP, 4GPP, 5GPP, or other cellular communication standards chipsets may be implemented as the network 216. The network may be in per-to-per network, Conductor-Player, recipient of pushed data, adhoc network, or another configuration depending upon implementation.

The battery/power supply 218 may receive power via a network connection, such as power over ethernet (POE), induction, or radio radiation, wire direct current, or wired alternating current. The battery/power supply 218 may have one or more batteries that may be used to power the IOPCD 102 and/or maintain data in memory 204.

The IOPCD 102 may have a display 106 that is coupled with a touchscreen 222 that enables input from a user to be processed by processor 202. In other implementations, buttons (not currently shown) may be present for scrolling through menus displayed on display 106 and select desired entries. Further, a reset button may be present that enables the device to "reboot" or be reset to "factory" settings.

In some preferred embodiments, a clock/GPS 224 is coupled to the processor to provide timing for the processor operation and/or for syncing actions between IOPCD 102 and other IOPCDs. The clock may be as simple as an oscillator or as complicated as a real-time clock. In other implementation, the clock/GPS 224 may be implemented as a GPS receiver that receives timing data from a satellite system and determines the time and location data from the received satellite system. In yet other implementations, the clock 204 may be part of 3GPP, 4GPP, or 5GPP cellular communication chipset that receives timing and location data from a cellular network.

Figure 3:
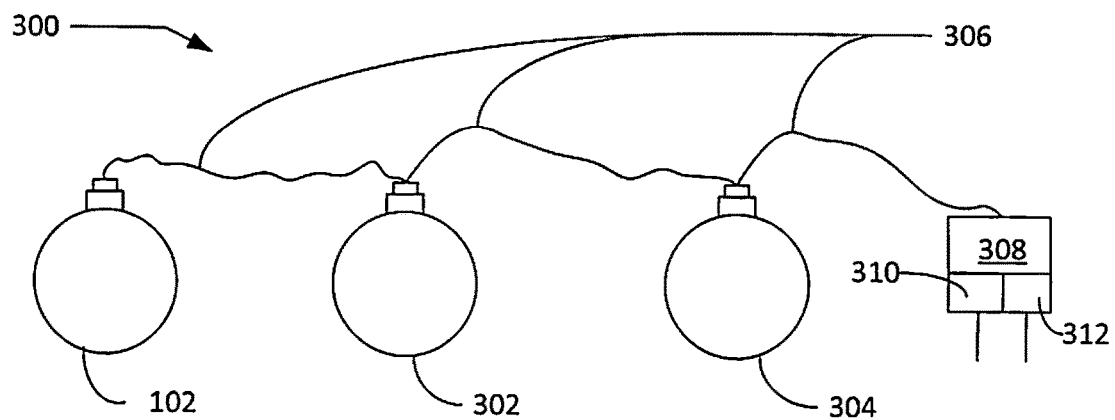
FIG. 3 is an illustration of the interactive ornamental processor-controlled device of FIG. 1 networked with additional interactive ornamental processor-controlled devices in accordance with an example implementation.

In FIG. 3, an illustration 300 of the IOPCD 102 of FIG. 1 networked with additional IOPCDs 302 and 304 in accordance with an example implementation. The IOPCDs are networked together via a wired connection 306 that is connected to a power plug 308. The power plug 308 is configured with an AC/DC converter 310 to convert household A.C. power to D.C. power. The power plug 308 also contains networking over electric interface 312 (such as X10 or ethernet over A.C.). The network over electric interface 312 converts data received over the power network into data that is sent over the network 306.

Figure 4:
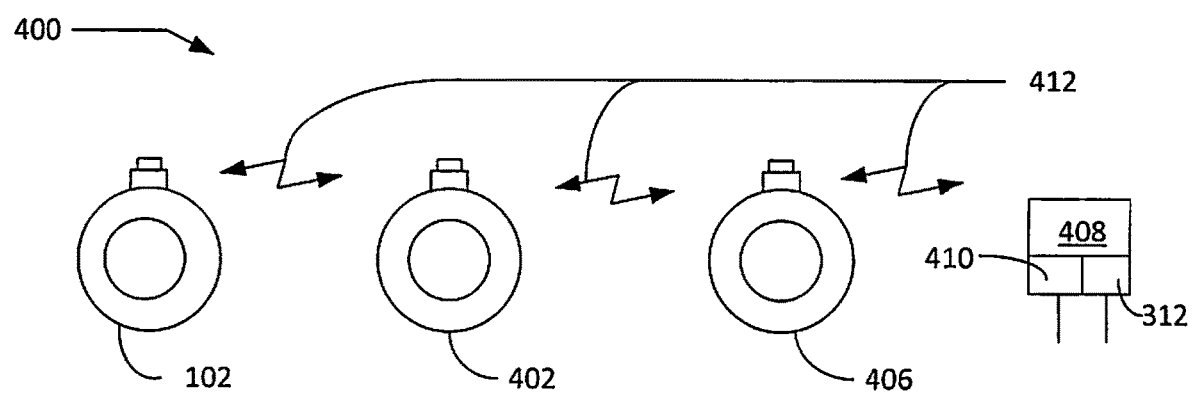
FIG. 4 is an illustration of the interactive ornamental processor-controlled device of FIG. 1 networked wirelessly with additional interactive ornamental processor-controlled devices in accordance with an example implementation.

Turning to FIG. 4, an illustration 400 of the IOPCD 102 of FIG. 1 networked wirelessly 412 with additional IOPCD 402 and 406 in accordance with an example implementation. The IOPCDs are networked together wireless connection that is also coupled to a power plug 408. The power plug 308 also contains wireless network capability 410 to communicate with the IOPCDs. The network over electric interface 312 converts data received over the power network into data that is sent over the wireless network 412.

Figure 5:
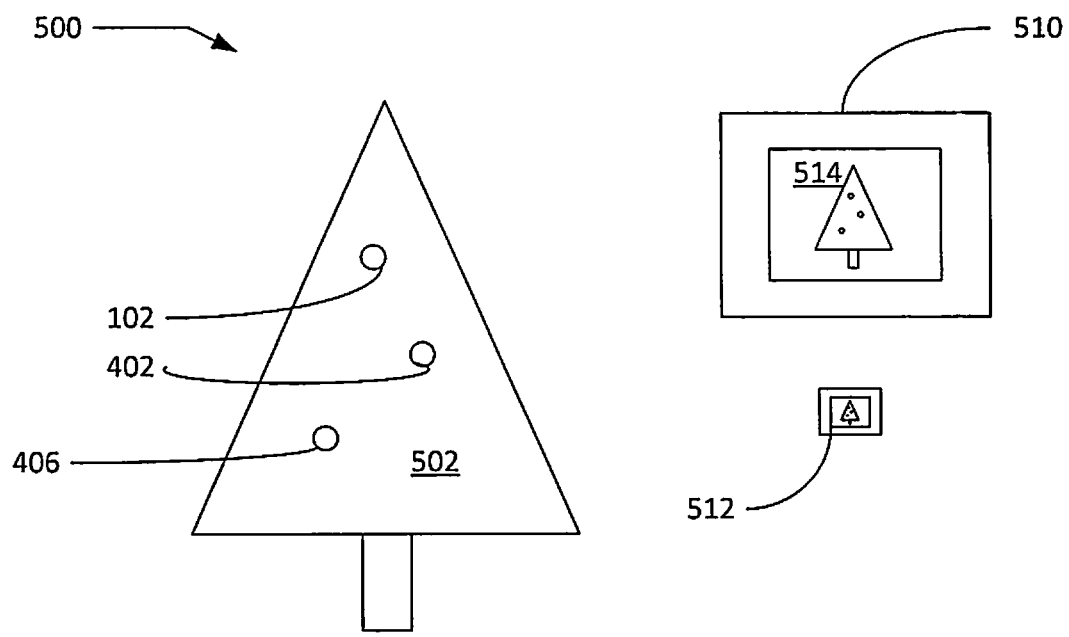
FIG. 5 is an illustration of the networked interactive ornamental processor-controlled devices of FIG. 4 provisions by a controller in accordance with an example implementation.

In FIG. 5, an illustration of the networked IOPCDs 102, 402, and 406 of FIG. 4 is provisioned by a controller 510 in accordance with an example implementation. A holiday decoration, comprising a IOPCD use environment, such as Christmas tree 502 has the IOPCDs 102, 402, and 406 placed upon it and turned on or woken up if in a sleep mode of operation.

A controller 510, such as a tablet, smartphone, and/or personal computer with a camera, takes a picture of the holiday decoration with the IOPCDs 102, 402, and 406. A user interface 514, such as described in U.S. patent application Ser. No. 16/690,087, filed Nov. 20, 2019, and incorporated by reference in its entirety herein access the picture or image and records the placement of the IOPCDs 102, 402, and 406. In other implementations, a picture of the room may be used with IOPCDs used as the IOPCD System use environment to decorate a room. In some preferred embodiments, the user interface 514 then determines the synchronization of audio and images between the IOPCDs. One of the IOPCDs, such as 102 may be selected by controller 514 to be the "Conductor" and be in charge of content display and performance control elements, such as coordination synchronization (e.g., with respect to itself and one or more IOPCDs desginated as "Players"), start function control, stop function control, timing correction control, volume control, brightness control, special effects control (including for example, start and stop control thereof), and control timing and other elements pertaining to the performance and execution of media being played, including without limitation "Show" (as that term is used herein) performance control. In other implementation, the order of accessing an ad hoc network can establish which IOPCD is a Conductor and which IOPCDs are Players. In some preferred embodiments the user may select of which IOPCD is the Conductor and which are IOPCD(s) is(are) Players.

In some implementations, the content may be pushed from external sites via a server to the IOPCDs 102, 402, and/or 406 providing, for example, audio, video, multimedia, and text messages from others, such as family members located at other locations, advertising, or even emergency messages and/or weather alerts. In some implementations, the content may be pushed from external sites via a server to an application ("App") installed and operating on a processor controlled smart device having at least a memory and display, such as a smart phone, tablet, computer or similar device. The App then manages the content in part by storing it on the smart device and transmitting it to the appropriate IOPCDs. In yet other implementations, the content may be stored to a storage server, such as a cloud server, and later distributed to the IOPCDs 102, 402, and/or 406.

In some preferred embodiments, the App, which is also sometimes referred to herein as the graphic user interface, "GUI", the user interface, or similar language, provides the functionality and/or the graphical, voice, and/or haptic user control over (i) content acquisition for transmission and/or performance on one or more IOPCDs (e.g. from where such content is acquired, e.g., from the device, such as a smart phone, on which the App is functioning, from a remote storage device such as a remote server, and/or the memory storage of one or more IOPCDs), (ii) content transmitted to the IOPCDs, including without limitation, coordinated content segments for performance of coordinated "Shows" as that term is used herein, (iii) how content appears and sounds on one or more of the IOPCDs (e.g. by individual IOPCD, user or automatically created IOPCD group, or IOPCD system wide control of brightness, sound amplitude, playback repetition, playback speed, etc.), (iv) when such content is performed (e.g. order of playing, timing, scheduled time of play, etc.), (v) content file playing order, specifically, e.g., the order content files are played in a user created, third party created, or automatically assembled (or otherwise provided) "Playlist" of sequentially listed content items ("Playlist Segments") to be played or performed on an IOPCD, (vi) Playlist creation and modification (e.g. item inclusion control, item removal control, item naming, etc.), (vii) Playlist elements control (content item ordering, looping, muting, unmuting), (viii) Playlist saving and recalling, (ix) devices included in, "on-board", and/or otherwise associated with one or more IOPCDs (e.g. on/off and other control of on-board IOPCD camera(s), microphone(s), special effects devices (scent emission device(s), other content ejection devices (e.g., glitter, confetti, etc.), IOPCD shape change devices, (e.g., motors, actuators, solenoids, etc.), image projector(s), etc., (x) user and/or automatic designation and/or control of which IOPCDs will function as the "Conductor" and which will function as "Players", (xi) other coordination and timing control, (xii) pairing and/or other onboarding function controls, including without limitation, recognition and adding of new IOPCDs to a IOPCD system ("IOPCD System") under the control of the App, (xiii) providing such IOPCDs with names and/or other associated identification data, (xiv) removal of IOPCDs from one or more IOPCD Systems, (xv) IOPCD System saving and retrieval control, (xvi) user and/or automatic designation and/or control of relative location data pertaining to IOPCDs in one or more IOPCD Systems via, for example by (a) providing a graphical user interfaces of the environment in which the IOPCDs in the IOPCD System with function (e.g. a graphic or picture of a Christmas tree, a desk, a room, etc.), (b) providing graphical representations (e.g., icons) of IOPCDs in the subject IOPCD System, (c) providing the user with means for moving the graphical IOPCD representations (e.g. by the user's finger on the touch screen of the smart device running the App) onto the use environment graphical representation (e.g., a graphic or picture of a Christmas tree, desk, room, etc.) to locations relative to one another on the graphical representation of the environment that approximates, matches or simulates the actual relative location of the respective IOPCDs in the user's actual physical environment (e.g. on the user's actual Christmas tree on which such IOPCDs will function), (d) providing means of indicating and providing to [x] one or more IOPCDs, [y] the device(s) running the App, and/or [z] one or more external devices, including without limitation remote servers, AR devices, VR devices, drones, interactive toys, etc., the relative location of IOPCDs in the IOPCD System (or subset of such IOPCDs), including, without limitation, by means of association of the aforementioned graphical interface(s) with X-Y or X-Y-Z grid functionality which can provide relative coordinate locations of IOPCD icons in the graphic relative to one another, (xvii) generation and selection of graphical representations of the environment in which the IOPCDs will operate, including without limitation by providing graphical representations of possible environments (Christmas trees, desks, rooms, etc.) and by providing means for user to use a photograph or video (e.g. stored in the device that is running the App or downloaded to the device from an external source), (xviii) functionality that provides the user with an in-App means to take a photograph or make a video by accessing and using the photographic and videographic functional abilities of the device, including without limitation the ability to create 360 degree or spherical photographs and videos, to produce a photograph and/or video that can be used to generate the photographic/videographic virtual environmental representation (PVVER) of the real physical environment in which the IOPCD System will be functioning for the purpose of enabling the user to virtually orient the location of the IOPCD graphical representations (e.g., icons) relative to one another on or otherwise in association with such PVVER to effectuate the creation of data (e.g., using one or more X-Y or X-Y-Z grid functions) that provides the user with the ability to generate system usable data of an approximation of the relative locations of IOPCDs in the actual use environment, (xix) other means of IOPCD location determination (e.g., control of other locating means, such as triangulation of signals emitted by IOPCDs, other IOPCD signal emission, such as the display of light of a pre-selected wavelength on the displays of the IOPCDs that is detected by App functionality using the camera(s) resident in the device running the App or detected by the App analyzing one or more photographs and/or videographs of the IOPCDs emitting such signal in the use environment, (xx) similar functions of "shells", also referred to as "DecoForms" and/or other devices that IOPCDs are associated with, including without limitation, control of content selection and performance of content in and/or on DecoForms.

In preferred embodiments of the invention "Playlist Segments" also comprise for example, and without limitation, content performance instructions, Show data, scheduled performance time data, etc. In some preferred embodiments, for example, a third party can arrange for its content, such as advertising or other promotional content to be played at certain specified times in association with the performance of one or more Playlists on one or more IOPCDs in the IOPCD System. In such embodiments, for example, the specific time(s) such content will play in association with the performance of such Playlists is provided to the App and/or one or more IOPCDs as a control data part of the Playlist Segment.

Without limiting the foregoing, in preferred embodiments of the invention, the App provides users with functionality to (a) import content into the App for Playlist creation from any content source accessible by the App, (b) select files to become Playlist Segments, (c) determine the number of times a Playlist Segment entry will repeat, if any, (d) assemble complete Playlists, (e) edit Playlist Segments playing order, (f) determine the number of times the entire Playlist will repeat, if any, (g) name Playlists and edit Playlist names, (h) save and recall Playlists, (i) selectively view content listed in the Playlist in a preview viewer window included on the Playlist Control Panel page, (j) access editing features of the App for selected Playlist Segments, (k) control the starting, stopping and pausing of the playing and/or other execution of individual Playlist Segments, (l) control the starting, stopping and pausing of the playing of an entire Playlist (m) control the sound volume and muted/unmuted state associated with the performance of a Playlist Segment, (n) control the brightness level of the display of a performance of a Playlist Segment, (o) control the sound volume and muted/unmuted state associated with the performance of an entire Playlist, (p) control the brightness level of the display of a performance of an entire Playlist, (q) upload Playlists to one or more IOPCDs, (r) upload content associated with Playlists to IOPCDs, (s) upload control data associated with Playlists and/or Playlist Segments to IOPCDs, (t) download Playlists from one or more IOPCDs and/or other external storage locations to the App (u) download content associated with Playlists from one or more IOPCDs and/or other external storage locations to the App, (v) download control data associated with Playlists and/or Playlist Segments from IOPCDs and/or other external storage locations to the App, (w) control the volume, muted/unmuted and display brightness state of the entire IOPCD System, (x) determine, establish, record and transmit actual, simulated and/or virtual locations of IOPCDs relative to other IOPCDs associated with an IOPCD System, (y) receive Show content segments and effectively assign such Show segment content and other content appurtenant to coordinated multi-IOPCD performance to appropriate IOPCDs to effectuate proper playing of Show content and other coordinated content, (z) control any and all of the functions above that are operative in or in association with DecoForms and/or other devices associated with one or more IOPCDs, one or more IOPCD Systems, and/or the App.

In some preferred embodiments, the App may also provide one or more of the following controls:
(a) an Ornament device on/off control (for example on each Ornament Playlist Control Panel Page);
(b) a System/App on/off control (for example on the Location/Orientation of My Ornament devices Page);
(c) a system timer to effectuate system on/off at programmable specified times;
(d) a master volume control/mute (for example included in each page of the App);
(e) an individual Ornament volume control/mute control (for example, in each Ornament Playlist Control Panel Pages);
(f) an individual Ornament display brightness control (for example, in each Ornament Playlist Control Panel Pages);
(g) an Ornament power saving mode on/off control (for example in each Ornament Playlist Control Panel Pages);
(h) content file selection and content upload controls (for example in each Ornament Playlist); and
(i) controls associated with the display, selection, and engagement of company and/or third-party advertising, upgrade options and enhancements, product displays, and purchase or gift redeeming controls, e.g., regarding Ornament display content, purchasable products, gift redemptions, etc. (in Ornament Playlist Control Panel page and Notifications page). In some embodiments of the invention functionality may be provided through the engagement of hyperlinks to enable the App (and the Ornament system) to connect with a remote server for accessing and displaying content and accessing files related to such advertising, upgrades and enhancements, etc. (for example via a control means on the Ornament Playlist Control Panel page and Notifications page).

Clock Application. In some preferred embodiments a clock application which displays a clockface and accurate time on one or more IOPCDs is provided. In some preferred embodiments control of this feature (e.g., selection of the feature, clock types, etc.) will be from a linked page accessible from the "Additional Features" part of the drop-down menu accessible on each page of the App.

In some preferred embodiments IOPCDs also include the means for generating selectable screen saver looped content that will play on the Ornaments when unlooped Playlists reach conclusion. In preferred embodiments one of the screensaver selections is one or more clocks which will be engaged and be displayed. In some preferred embodiments the Ornament will access online trusted time sources for time data. In some embodiments a programmable clock function is included in the Ornament that can be set by a user.

In some preferred embodiments content downloaded to the App alone or with content resident on the device on which the App is running is configured by the user (or in some embodiments wholly or partially automatically) into one or more Playlists. In some such preferred embodiments one or more such Playlists are transmitted to one or more IOPCDs. In some preferred embodiments the transmission of such Playlists includes transmission of content files corresponding to the content items listed in the Playlist. In some embodiments, such as when content files corresponding to one or more content items listed in the Playlist are already in the memory of a target destination IOPCD for the transmission of the Playlist, Playlist identification, descriptive and/or control data for such Playlist are transmitted without a copy of content files corresponding to such Playlist items for which content files are already in the accessible memory of such target destination IOPCD.

In some preferred embodiments Playlists are assembled through the use of the App associated with onboarded IOPCDs. In some preferred embodiments the Playlist items listed in the Playlist comprise content files of content that is resident on the device running the App, on one or more IOPCDs, and/or one or more remote storage devices, such as a remote server. In some preferred embodiments the playing of the Playlist and corresponding content items in the Playlist may be previewed by the user in a preview window generated by the App before the Playlist is transmitted to one or more IOPCDs. The preview function enables the user to evaluate how the content will appear on a subject IOPCD and make modifications before uploading to the IOPCD. The preview function also helps minimize the number of performance interruptions or glitching of the playing of an already existing Playlist or content associated therewith that can happen in association with processor overloading, etc. associated with Playlist and content transmission to one or more IOPCDs.

An innovative element of the IOPCDs is the ability to synchronize the playing of media from devices that are located apart from each other, taking into account network delays and processing speed. Furthermore, the ability affects the other IOPCDs when an individual IOPCD is being used, such as muting other IOPCDs when a user is using an IOPCD to record a video message for transmission to others via the network and/or internet to other IOPCDs locally and remotely, email, or uploading to services such as YOU-TUBE or TWITTER.

Figure 6:
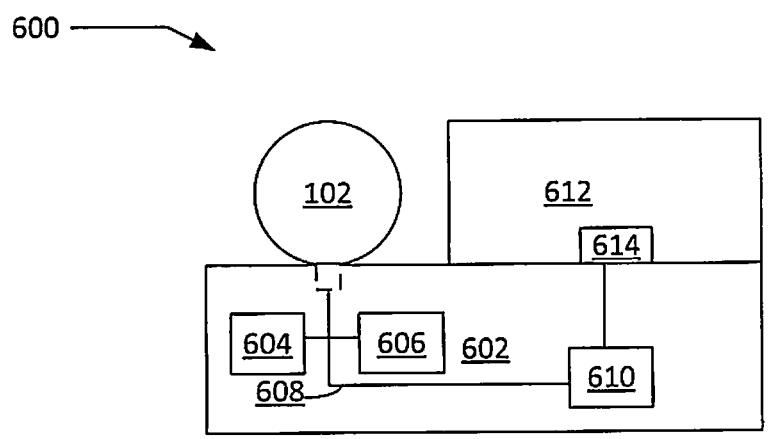
FIG. 6 is an illustration of the interactive ornamental processor-controlled device of FIG. 1 controlling an adjunct device in accordance with an example implementation.

Turning to FIG. 6, an illustration 600 of a graphical user interface 602 (also referred to as "App") on a smart device 604, such as a smartphone, for configuring multiple IOPCDs 606 in a holiday display or other IOPCD System use environment.

The configuration of multiple IOPCDs in spatial relation to each other is important to ensure that content components of a multi-Ornament "Show" in which Show content components are displayed on a multi-IOPCD system in a coordinated manner are displayed properly to effectuate the intended coordinated content display. In some preferred embodiments, the App provides a user interface in which a representation of the physical environment in which the Ornaments will be operational. For example in some preferred embodiments, a graphical representation of a Christmas tree is selectively provided in the App from among other graphical or pictorial representations of IOPCD System use environments (e.g., a desk, a room, a picture of the environment taken by the user, etc.) in which the IOPCD Ornaments will operate. In some preferred embodiments, Onboarded Ornaments are displayed, for example, in a vertical line on the page where the Christmas tree graphic is also displayed.

Figure 16:
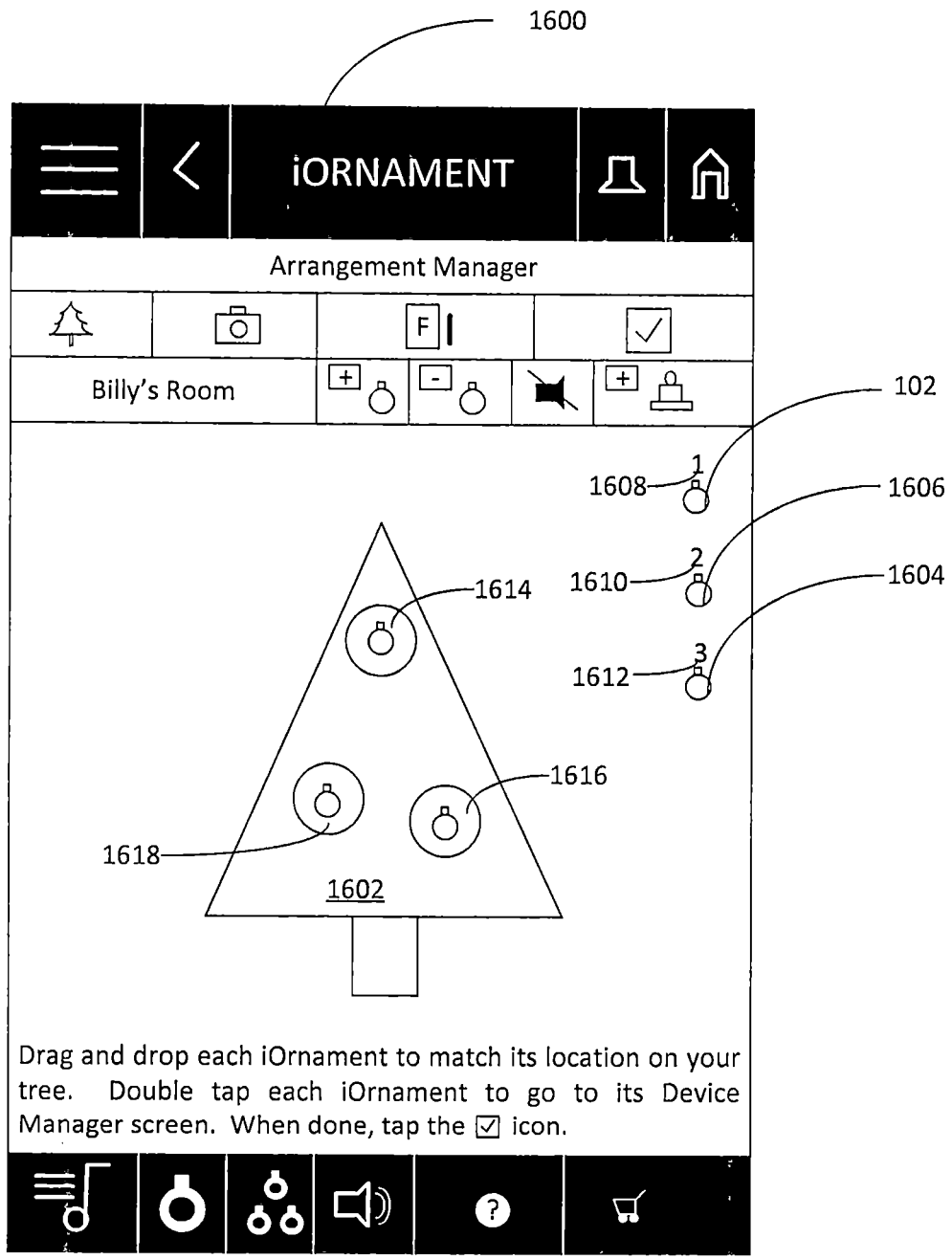
FIG. 16 depicts an application displayed on a smart device for placement of the interactive ornamental processor-controlled device of FIG. 1 on a tree image in accordance with an example implementation.

In FIG. 16, an application 1600 displayed on a smart device for placement of the IOPCD devices 102 of FIG. 1, 1604, 1606 on a tree image 1602 is depicted in accordance with an example implementation. Each of the listed Ornaments 102, 1604, and 1606 is identified by a displayed number 1608, 1610, 1612, name or another identifier, provided by the App 1600 at the time of onboarding of the respective Ornaments to the IOPCD system. The user next moves the graphical representations of the Ornaments 102, 1606, 1604 onboarded in the IOPCD system to their respective locations on the graphical Christmas tree image 1602 to relative locations 1614-1618 to one another corresponding to their respective locations where the user has hung the subject Ornament on the actual physical Christmas tree. The subject graphical interface, in the current example depicting a Christmas tree 1602, is associated with an X-Y grid provided in the App such that the location of the graphical representations of the respective Ornaments in the IOPCD system in relation to each other can be determined through association on the X-Y grid with specific X and Y coordinates. The location of the graphical representation of the IOPCDs in association with a graphical representation of the use environment in which the IOPCDs, both in association with an X-Y, or in some embodiments, X-Y-Z grid, provide a means of generating relative location data indicating where on such grid(s) the graphical representations of the IOPCDs are located, which data is then provided to (a) one or more IOPCDs, (b) the device(s) running the App, and/or (c) one or more external devices, including without limitation remote servers, AR devices, VR devices, drones, interactive toys, etc. in order to provide a usable indicia of the relative location of IOPCDs in the IOPCD System (or subset of such IOPCDs) to one another provided that the user orients the graphical representations of the subject IOPCDs in the aforementioned graphical interface in the App in a manner that mirrors, approximates or simulates where the respective IOPCDs are located in physically in spatial relation to each other.

In some preferred embodiments the generation of usable data regarding the location of the IOPCDs in an IOPCD system is effectuated by signals generated by the IOPCDs in the environment in which they are or will be operating. In some preferred embodiments the signal is a color or shape generated on the display screen of IOPCDs that is recognized by the App through the use of one or more cameras associated with the device on which the App is running. In some preferred embodiments the locations of the IOPCDs are determined through triangulation means whereby audio or other signal (e.g., microwave) emission by the IOPCDs are detected by signal detection means in association with the microphones and/or other signal detection means in one or more devices running the App and the data resulting from such signal detection is computationally processed by processors associated with the device, the App, one or more IOPCDs and/or one or more remote processors to determine the locational source of the subject signal emission. In some embodiments of the invention the location of the IOPCDs in physical space is determined by detection of a signal generated by the IOPCDs whereby the signal is the display of a light of a particular color on each of the IOPCD displays in the physical space and such light is detected via the use of the smart phone's camera and use of photographic data processing means provided by the App, the smart phone, a third-party application or a combination of the foregoing.

In still other embodiments of the invention on-board GPS or other locational signal detection devices are used to provide locational information regarding IOPCDs in the IOPCD System to (a) one or more IOPCDs, (b) the device(s) running the App, and/or (c) one or more external devices, including without limitation remote servers, AR devices, VR devices, drones, interactive toys, etc., in order to provide a usable indicia of the relative location of IOPCDs in the IOPCD System (or subset of such IOPCDs) to one another.

In some preferred embodiments, some or all of the graphical user interface features of the App are displayed in a heads-up display, an AR headset or display and/or in a VR headset or display. In some preferred embodiments control of some or all of the functions of the App are performed through the use of haptic devices and/or other controller devices that enable a user to effectuate App control functions in three-dimensional space. In some preferred embodiments for example, App control is effectuated by a wand, a wand-like controller (such as, for example, the controller described in U.S. Pat. No. 10,991,352, the full text of which is incorporated herein as though set forth in full), a hand controller or through the use of finger controller devices, such as, for example, finger controller devices described in one or more of U.S. Pat. Nos. 9,996,170, 10,540,019 and 11,199,913.

In still further embodiments, such App control is effectuated with App user interface display(s) provided to the user via one or more displays associated with or comprising one or more AR and/or VR devices.

A camera on smart device 604 may be used to take a picture by selecting the camera button 608 of the actual holiday display or a generic representation, such as a picture, maybe loaded by selected with button 610. When the holiday display is depicted 612, a user may tap on each of the ornaments 606 individually and place it upon the tree in the position where the actual Ornament resides in the physical world. In some implementations, the camera(s) may take a panoramic, surround, spherical or three-dimensional images of the IOPCD System use environment, holiday display or room, etc., and that (those) may be used as the depiction. A button 614 or other input, such as two-finger drag, may be used to turn the image for placement on the IOPCD System use environment representation or holiday display representation on any side of the IOPCD System use environment or holiday display representations.

In a preferred embodiment of the invention, only IOPCDs that have been activated, paired or functionally associated with the IOPCD System mapper in the graphical user interface 602 as holiday ornaments (i.e., paired IOPCDs) 606. An IOPCD graphical user interface for a holiday ornament may be accessed by double-tapping one of the IOPCDs 606. The volume of the IOPCDs 606 may be raised or lowered using the slide bar 616. The sound at the IOPCDs can be turned off with button "all off" 618 or muted with "Mute" button 620. The ornament icon corresponding to a paired (i.e., onboarded) IOPCD 622 may be tapped on to access a "My Ornaments page" that enables management of IOPCD parameters for the IOPCDs. A "menu icon" 624 may be selected to access a menu with options such as Account Management, Customer Service, Ornament Store, Special Officers/News, Settings. A signal strength to the Ornament Hub may also be present, such as signal strength bar graph 626. It is also noted, that if more IOPCDs 606 are present than can be displayed, additional pages of the GUI may be accessed showing the additional IOPCDs by selecting button "page X", where X is the current page number.

Figure 7:
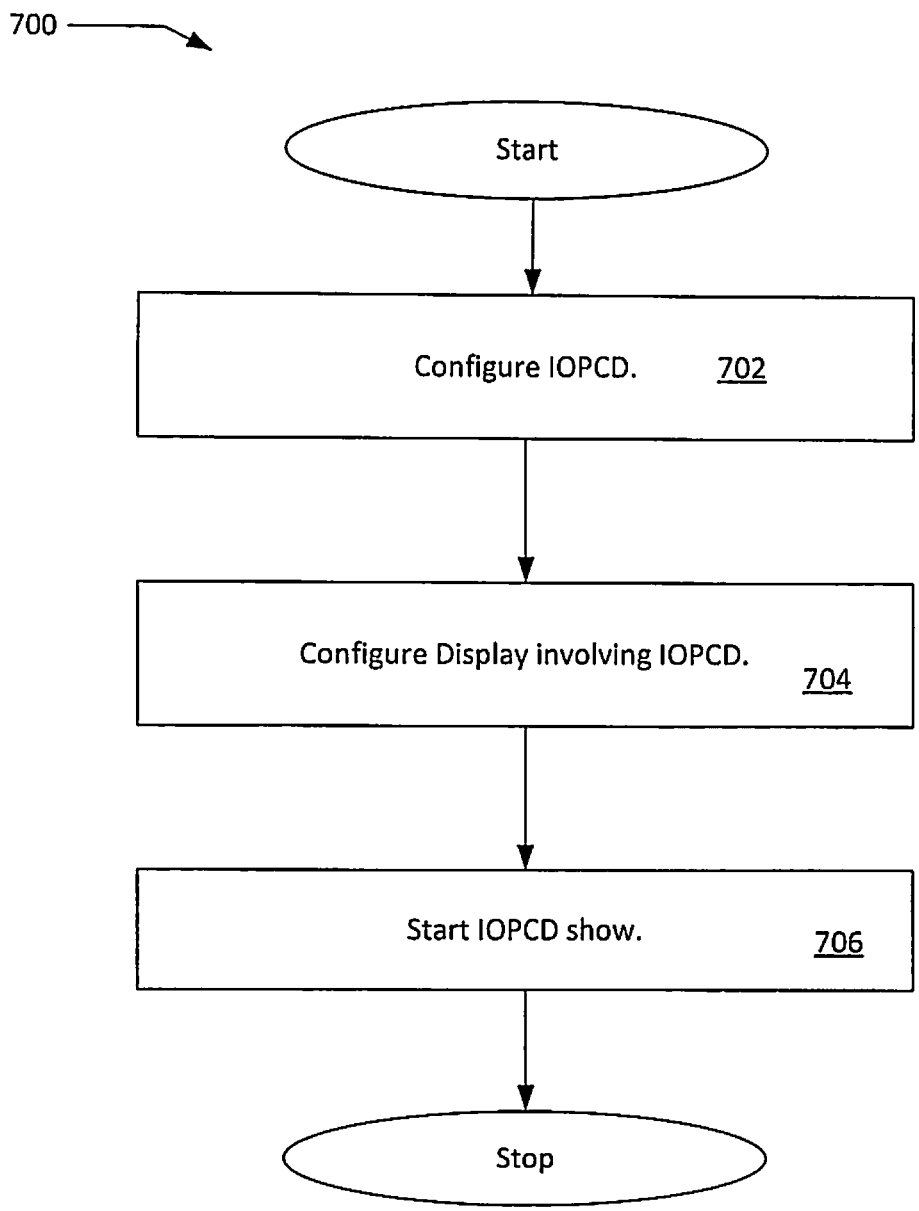
FIG. 7 is a block diagram of an approach for using an interactive ornamental processor-controlled device of FIG. 1.

In FIG. 7, an illustration 700 of a graphical user interface 602 on a smart device 604, such as a smartphone, for listing the multiple IOPCDs 706 in accordance with an example implementation. Each of the IOPCDs 706 are listed with an identifier, a number in this example implementation, the signal strength of the radio frequency connection (i.e., Wi-Fi, Bluetooth, 3GPP, 4GPP, etc. . . . ), and an "Edit" button 708 that brings up a GUI for configuration of an "individual IOPCD. If more IOPCDs are associated with the system than can be displayed in the listing of IOPCDs 706, then a "Next Page" 710 button maybe use to advance to the next page of IOPCDs. The "menu icon" 624 is also present in this display along with a "back button" 712 to go back to the previous page and a "home" button 714 to return the user to the main or home page of the application.

In some of the above embodiments the information generated and detected by the IOPCD application running of the smart phone is used to generate a digital representation of location on an X-Y or X-Y-Z grid with appropriate corresponding grid location indicia (coordinate numbers, etc.) which are used by the IOPCD App to determine where the IOPCDs in a designated grouping ("Arrangement") are relative to each other in physical space for use to assign content for coordinated Shows, etc. An example of video coordination would be a snow flake that appears to be being blown around the Christmas tree as images of the snowflake sequentially appear and disappear on the displays of IOPCDs participating in the Show are arrayed around the tree. It would appear to be moving from one IOPCD 102 to the next IOPCD in real time. Meaning there is a delay that occurs due to the space between the IOPCDs. In simple terms, for example, in some embodiments of the invention the IOPCDs function as "portholes" into the metaverse. In some preferred embodiments, the closer objects are to the portholes the more time between seeing an item move between them. In some preferred embodiments each IOPCD has a virtual viewing area for its video coordination. In general, the for the coordination effect of a Show that contains sound to be realized, it must occur with sound so each IOPCD is playing specified appropriate content consistent with the desired coordination effect during a Show at appropriate times. Furthermore, in preferred embodiments, coordination of sound moving between IOPCD is also coordinated.

In some preferred embodiments of the invention coordination of content and other activity performance by and between IOPCDs, such as in the current implementation, is effectuated through the use of one or more timed devices, such as through the use of one or more clocks. In some preferred embodiments, each IOPCD is connected to the internet and has an internal clock either integrated with the processor or as a separate real time clock chip, as in the current implementation. The IOPCD periodically, such as one in a 24-hour period, access a network time server, such as a network time server using the network time protocol (Ntp-d.nist.gov). A Conductor IOPCD or similar controller identifies a Show to be executed on a plurality of IOPCDs at a specific time. When that time occurs, all IOPCDs executes the Show in a coordinated manner, for example in some preferred embodiments through an initiation start signal sent from the Conductor to Player IOPCDs in relation to Show content segments to be played on the IOPCDs participating in the Show performance. The Show may be audio, video, multimedia, AR, VR, a combination of the foregoing and may further include transmission of coordinated Show information to one or more devices such as lights, external sound devices, AR devices, VR devices, devices listed in one or more of the Inventor's Patent Documents, and other devices capable of interacting with an IOPCD System.

In other implementations, the coordination may be accomplished between IOPCDs and/or one or more smart devices (controller) using messaging of a communication protocol that includes the transmission time. The IOPCDs are then able to determine their clock offset from the transmitted message to determine time offset to achieve coordination between the IOPCDs. In yet other implementations, each IOPCD may have an accurate clock, such as one derived from a GPS signal and maintain coordination relying on that signal. In yet other implementations, an event detectable simultaneously by all IOPCD may occur to establish timing. Such an event, may be a plurality of light flashes in a predetermined interval or pattern detected by each of the IOPCDs' cameras. Similarly, a sound pattern may be used to establish coordination and timing using the microphone on each IOPCD.

Once placement or orientation of the IOPCDs is known, and the IOPCDs have a common timing, special coordination may occur for elements of a Show. Special coordination occurs by the processor of each IOPCD using time and knowledge of the location of the other IOPCDs to add delays for elements of multimedia Show. A formula for such a delay is Delay=(distance from previous IOPCD to current IOPCD)×virtual speed of object. That delay may be used with both audio and video components of a multimedia element. For example, a balloon deflating shown flying around a room and appearing in one IOPCD with its' deflation sound and then virtually flying and after the delay balloon appears in the next IOPCD. The sound can be played by all IOPCD with an increase in volume at the IOPCD the balloon appears in. In other implementations, the sound will only appear in the IOPCD where the balloon appears.

Figure 17:
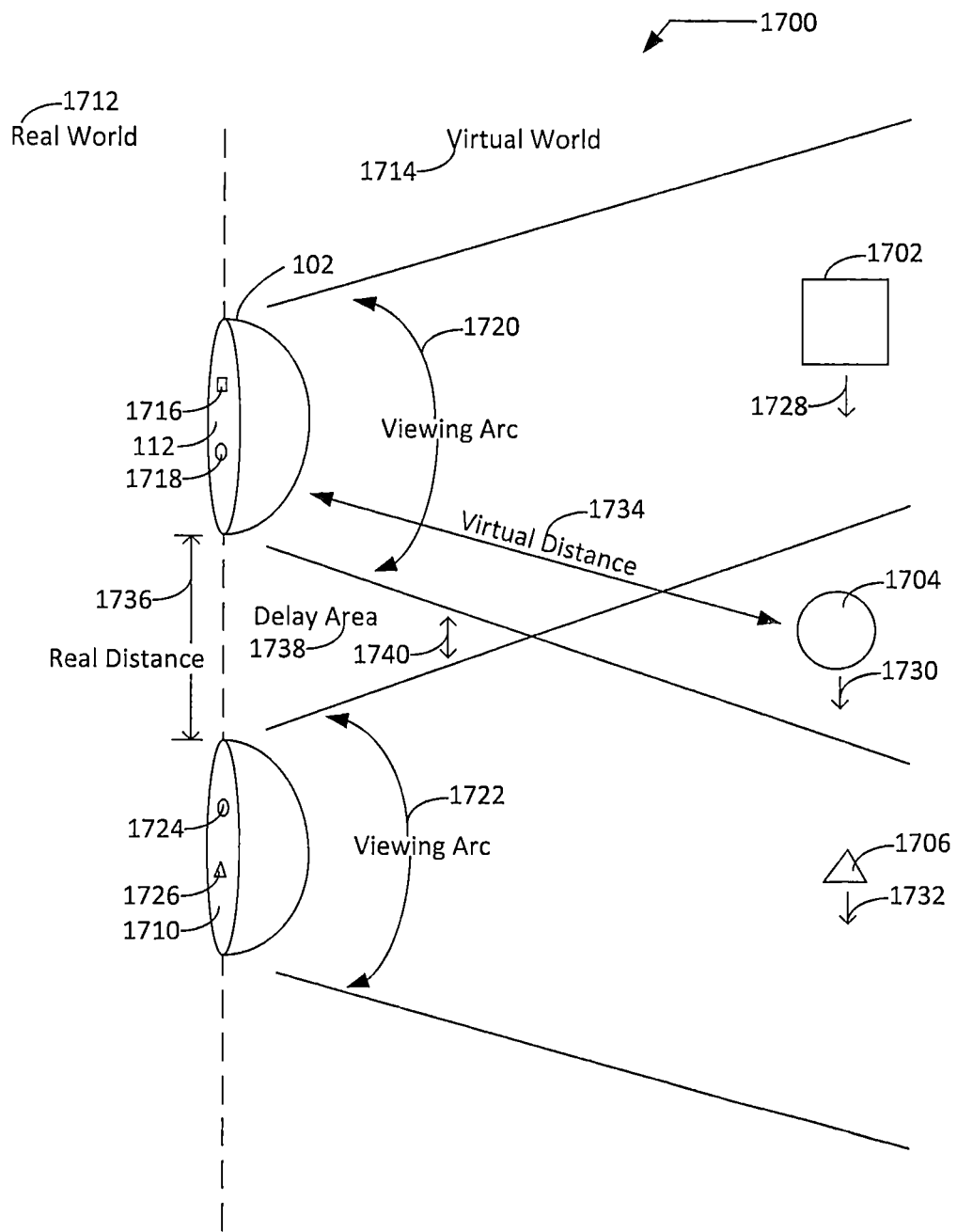
FIG. 17 depicts coordination of multimedia "Show" elements across multiple interactive ornamental processor-controlled devices in accordance with an example implementation.

FIG. 17 depicts 1700 coordination of multimedia Show elements 1702, 1704, 1706 across multiple IOPCDs 102, 1708 in accordance with an example implementation. Each of the IOPCDs 102, 1708 has an associated display 112, and 1710. Each of the IOPCDs is in the real world 1712 and displays a portion of the virtual world 714. For example, IOPCD 112 displays on its display 112 virtual elements square 1702 and circle 1704 a period of time depicted 1700 in the display 112 as depicted square 1716 and depicted circle 1718.

Virtual elements 1702 and 1704 are within the virtual viewing arc of 1720 of IOPCD 102. Similarly, virtual circle 1704 and virtual triangle 1706 are within the virtual viewing arc 1722 of IOPCD 1708 and displayed on display 1710 as depicted circle 1724 and depicted triangle 1726. Since virtual element 1702 is not in the viewing arc 1722 of IOPCD 1708, it is not displayed. Similarly, since virtual element 1706 is not in the viewing arc 1720 of IOPCD 102 it is not displayed. But, virtual element 1704 appears in both viewing arcs 1720 and 1722 and appears on both IOPCDs 102 and 1708.

FIG. 17 is just a frozen period of time. In practice virtual elements 1702, 1704, and 1706 are moving (as shown by the arrows 1728-1730, 1732. Therefore, each of the virtual elements will eventually pass through at least one of the viewing arcs. When the virtual element is no longer in the viewing arc, it will no longer be displayed in the IOPCDs 102, 1708 associated display 112, 1710.

Another aspect to special coordination is virtual distance 1734 between the IOPCD and the virtual element 1704.

Knowing the virtual distance 1734, real distance between IOPCDs 112 and 1708, viewing arc, and timing, the time period and location of each virtual object in the virtual world for displaying on IPOCD's display 112 can be determined along with the delay in the delay area 1738 (if any) between IPOCDs displaying a virtual element. For example, the amount of time a virtual element 1702 is displayed in the display 112 and location of the virtual element in the display 112 is dependent upon the virtual movement speed 1728. The virtual movement speed is used to determine the time the virtual element 1702 enters the viewing arc 1702 and its location in the viewing arc 1720 at each time period being displayed on display 112. The virtual distance to modify the virtual speed by the virtual distance.

The closer the virtual object is to the IOPCD, the faster it will appear to move. Thus, the virtual speed is increased by a factor of the virtual distance. The exact factor is correlated or associated with the virtual distance. It is understood there is a relationship between all the discussed variables and one variable may be derived from others.

In some implementations, the delay area 1738 represents an area where an IOPCD calculates a delay in displaying a virtual element based upon the real distance 1736 and virtual movement, such as 1728. The expiration of the delay represents when a virtual object would appear in a viewing arc after the delay. The virtual delay 1740 in the delay area 1738 may be calculated by the processor on the IOPCD 1708 using the virtual distance 1734, real distance 1736 and virtual speed of an object that moves, and viewing arcs 1720 and 1708. It is noted that the same approach may be used combined with sounds associated with the virtual elements or with just sound. For example, a ghost making spooky sounds that cannot be seen and are only heard flying around in the virtual world.

The following is a non-limiting example of the use of the App in regard to generating IOPCD location information and use thereof in regard to coordinated Show programming and performance on an IOPCD System. The user first on-boards the IOPCDs to the IOPCD System through use of pairing or a similar methodology. In the App the paired IOPCDs are provide unique identifiers corresponding to each IOPCD. In the use environment programming portion of the App (sometimes referred to herein as the Arrangement page or Arrangement programming), a representation of the relative orientation of the IOPCDs in the use environment is generated. The user accomplishes this by first selecting a use environment template from a plurality of use environment graphical representations, such as Christmas trees, desks, tables, night stands, baskets, rooms, etc. It is to be understood that in preferred embodiments the App also provides the user with the option of (a) selecting a photograph or video in the memory of the device on which the App is running, a photograph or video stored remotely on another device, such as a remote server, one or more of the IOPCDs, etc., or (b) creating a new photograph or video to be used. In the instant example a green Christmas tree is selected by the user from a list of use environments provided in the App. The App then generates a graphical representation of a Christmas tree and graphical icon representations of IOPCDs onboarded (e.g., paired) with the App for use. The user next arranges the IOPCDs as desired in the use environment by hanging them on the user's real Christmas tree. The user next moves the icon associated with an IOPCD hanging on the user's Christmas tree to a location on the graphic representation of the Christmas tree that approximates, mirrors or simulates the location of the corresponding IOPCD on the user's real Christmas tree thereby creating an "Arrangement."

In some preferred embodiments the App provides functionality whereby the user can activate a signaling feature in the IOPCD whereby double tapping the icon on the graphical interface, for example, will cause a control signal to be sent to the corresponding IOPCD that causes it to produce a display signal (e.g. flash red) and/or produce a sound (e.g., beep) in order to assist the user in determining which icon on in the graphical interface is associated with the actual IOPCD in the use environment. Through the use of associated an X-Y grid functionality associated with the graphical elements on the use environment page, data is generated by the App regarding the X-Y coordinate location of the icons corresponding to the IOPCDs in the IOPCD System in relation to one another. This orientation data is used by the App and other elements of the IOPCD System (e.g., the Conductor IOPCD processor(s), the Player IOPCD processor(s), processors in remote servers, such as content-providing servers, processors in AR devices, processors in VR devices and/or processors in other devices (e.g., toys, drones, DecoForms, etc.) to properly play programming, including but not limited to shows.

Continuing the example, the user after completing and selectively saving the orientation of the IOPCDs in the IOPCD System through the use environment page to create an Arrangement, the user next opens the Playlist page. In the instant example, the Playlist already exists with 4 content items listed. These four items comprise a photo of the user's dog, a video of a snowball, a URL corresponding to a video on YouTube of the user decorating a Christmas tree and a kaleidoscopic CGI animation that was downloaded from a third-party provider of content for use on IOPCD. The user engages the "add content" feature of the Playlist page of the App. The user is next provided with a list of content sources from which to select content to be added to the Playlist. The user selects "iHoliday Content Library." The App then engages a browser that connect the user through the App to the iHoliday Content Library. The user next navigates to the "Shows" section of the content library.

Figure 18:
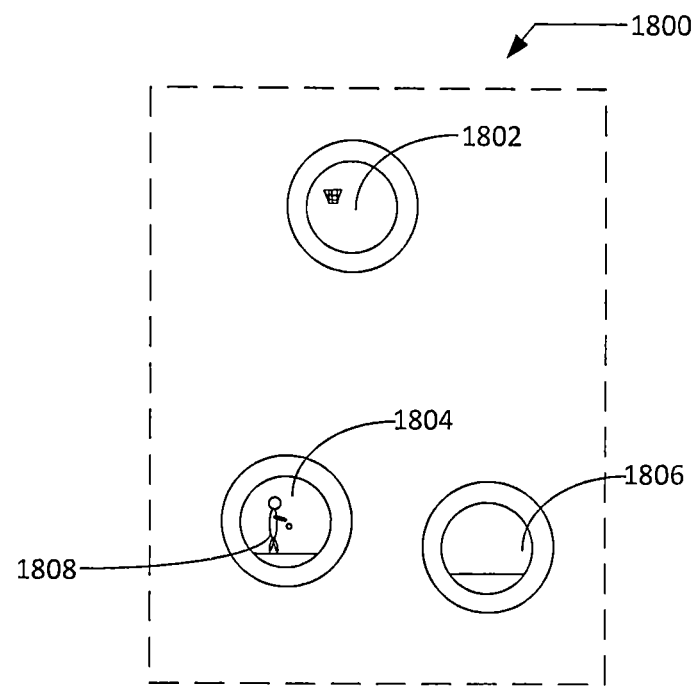
FIG. 18 depicts a basketball Show coordinated across three interactive ornamental processor-controlled devices with a basketball player element in accordance with an example implementation.

Turning to FIG. 18 a basketball Show coordinated across three IOPCDs 1802, 1804, and 1806, with a basketball player element 1808 is depicted 1800 in accordance with an example implementation. It is to be understood that this example depicts the result of the performance of three Show element files that have been loaded onto three separate IOPCDs which are performing a synchronized coordinated show with timing elements controlled by one or the IOPCDs that is a Conductor and two which are Players. The IOPCD 1802 has a basketball hoop while IOPCDs 1804 and 1806 depict different parts of a basketball court. Basketball player element 1808 appears to be dribbling the basketball in place 1808. The IOPCDs 1802. 1804, 1806 play a basketball game sounds with IOPCD 1808 also having a sound of a dribbled basketball.

Figure 19:
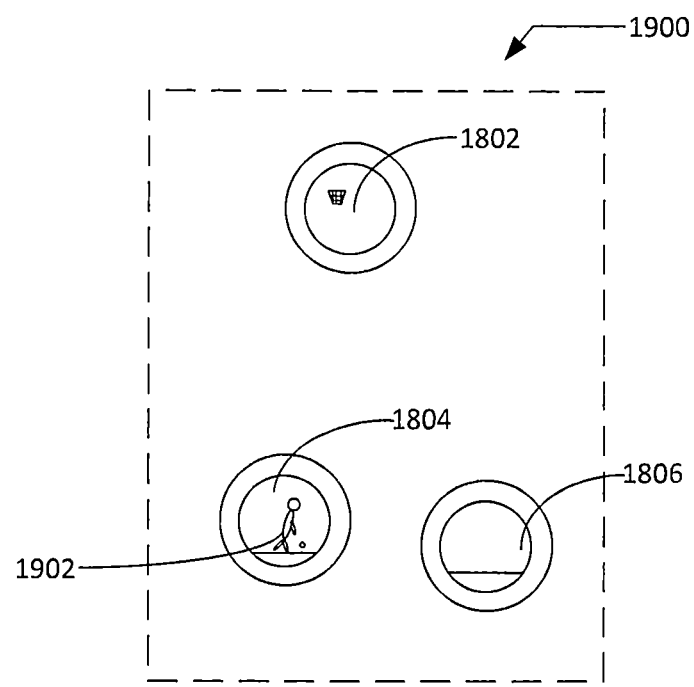
FIG. 19 depicts the basketball Show of FIG. 18 with a basketball player element moving in accordance with an example implementation.

In FIG. 19 the basketball Show of FIG. 18 across three IOPCDs 1802, 1804, and 1806 with a basketball player element 1902 moving in the IOPCD 1804 towards IOPCD 1806 in is depicted 1900 accordance with an example implementation. The dribbled basketball sound changes to a dribbled basketball moving with the basketball player element 1902.

Figure 20:
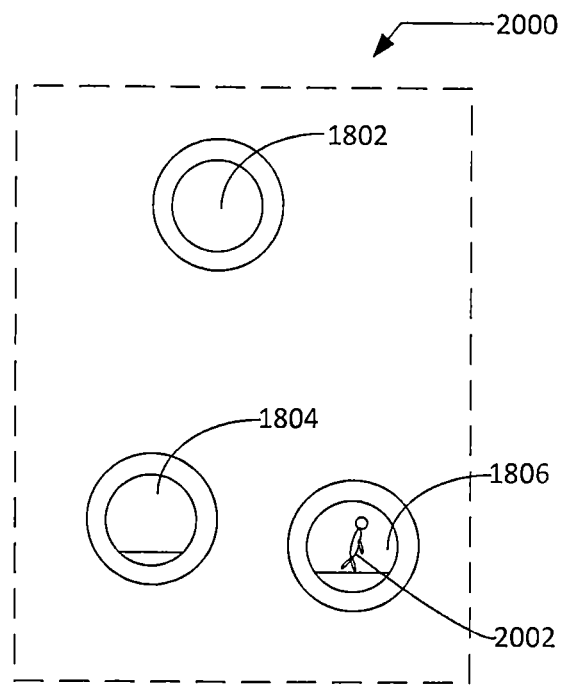
FIG. 20 depicts the basketball Show of FIG. 19 with the basketball player element moving to another interactive ornamental processor-controlled device in accordance with an example implementation.

Turning to FIG. 20, the basketball Show of FIG. 19 with the basketball player element 2002 moving to another IOPCD 1806 is depicted 2000 in accordance with an example implementation. The sound of the dribbled basketball is not originating from IOPCD 1806.

Figure 21:
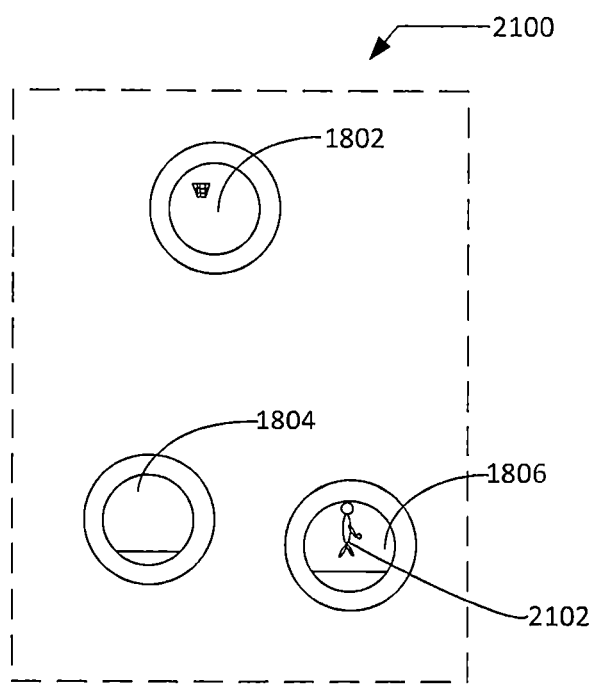
FIG. 21 depicts the basketball Show of FIG. 20 with the basketball player element shooting the ball in accordance with an example implementation.

In FIG. 21, the basketball Show of FIG. 20 with the basketball player element 2102 shooting the basketball in IOPCD 1806 is depicted 2100 in accordance with an example implementation. The basketball appears to shot towards IOPCD 1802 that has a depiction of a basketball hoop.

Figure 22:
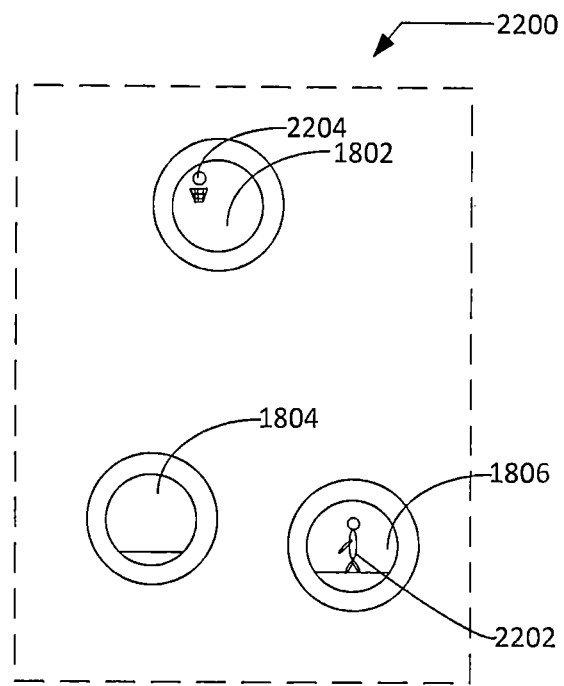
FIG. 22 depicts the basketball Show of FIG. 21 with the basketball player element leaving an interactive ornamental processor-controlled device and the basketball going through a basketball hoop on another interactive ornamental processor-controlled device in accordance with an example implementation.

Turning to FIG. 22, the basketball Show of FIG. 21 with the basketball player element 2202 leaving an IOPCD 1806 towards IOPCD 1804 and the basketball 1104 going through a basketball hoop on another IOPCD 1802 is depicted 2200 in accordance with an example implementation. It is noted that the instant show has been programmed to product an apparent delay between player leaving IOPCD 1806 and appearing in IOPCD 1804 in the current implementation to simulate the traveling through the space between the IOPCDs. Also in the instant example the programming provides for the sound of the basketball going off the backboard and through the hoop to originate from IOPCD 1802 while the player running sound (rubber shoe squeak) originates from IOPCD 1806.

Figure 23:
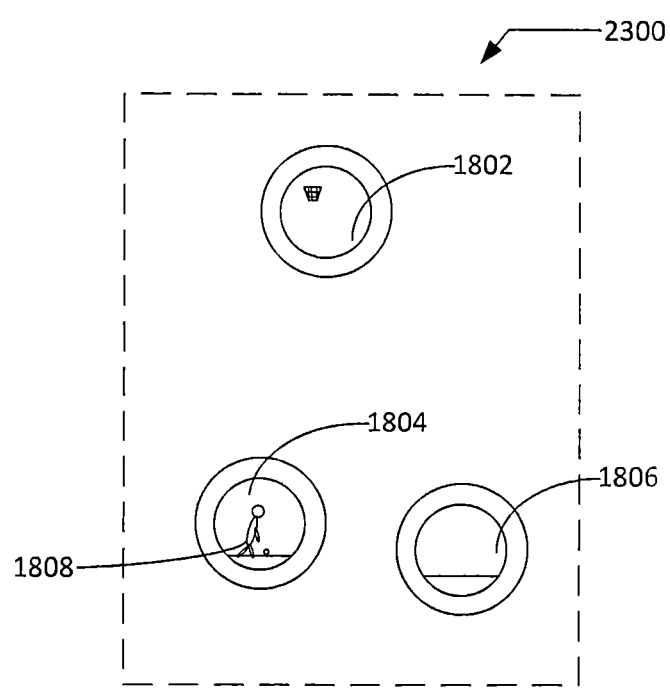
FIG. 23 depicts the basketball Show of FIG. 21 with the basketball player element back in its original position in accordance with an example implementation.

In FIG. 23, the basketball Show of FIG. 21 with the basketball player element 1808 back in its original position in IOPCD 1804 is depicted 2300 in accordance with an example implementation. IOPCD 1804 also has the basketball back in the basketball player' element 1808 and the dribbling sound originating from IOPCD 1804. Basketball game background sounds are also played at all of the IOPCD 1802, 1804, and 1806.

Figure 24:
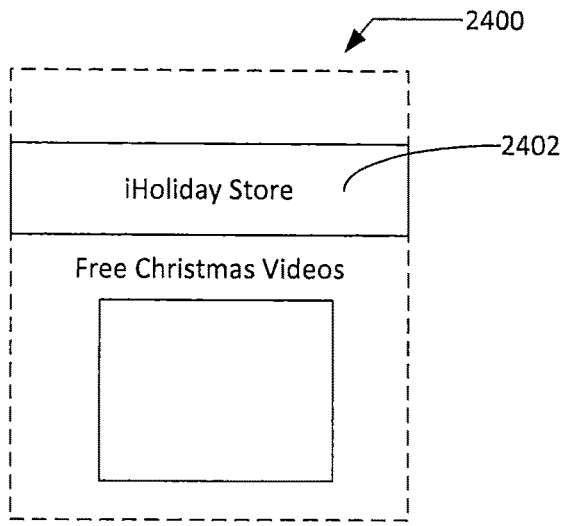
FIG. 24 depicts a user selecting an online store that provides/sales Shows in accordance with an example implementation.

Turning to FIG. 24 a user selecting an online store 2402 in an App that provides/sales Shows is depicted 2400 in accordance with an example implementation. The store may be an existing application store, such as the Istore™ or Play Store™.

Figure 25:
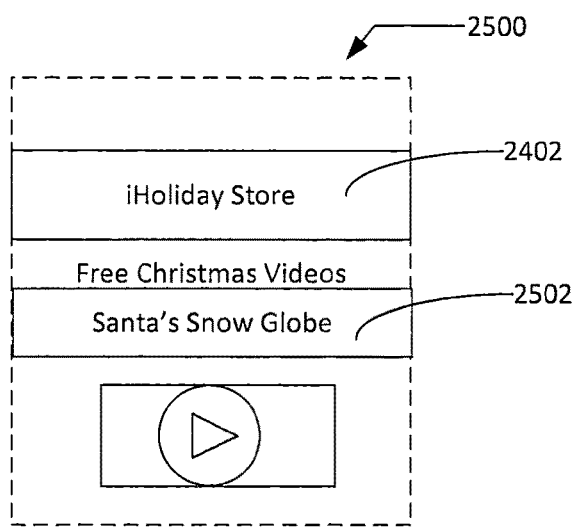
FIG. 25 depicts a Show that may be provided by the online store of FIG. 24 in accordance with an example implementation.

In FIG. 25 a Show 2502 that may be provided by the online store 2402 of FIG. 24 is depicted 2500 in accordance with an example implementation. The Show being depicted is a "free" no cost show for "Santa's Snow Globe" 2502. Once selected, the Show is downloaded to a storage location accessible to the App and registered or otherwise configured by the App for downloading to the IOPCDs. The Show will have to processed for the number of IOPCDs and their locations prior to downloading to IOPCDs. In other implementations, the IOPCDs may process the show for their respective parts.

Figure 26:
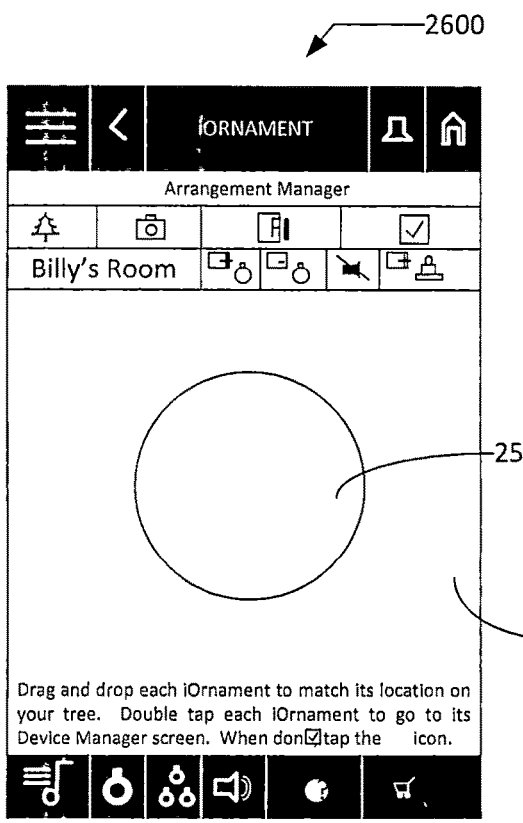
FIG. 26 depicts a Show of FIG. 25 that has been purchased and downloaded to control application that provides a list of available shows available to a user in accordance with an example implementation.

Turning to FIG. 26, a Show 2502 of FIG. 25 that has been purchased and downloaded to the App that provides a list 2602 of available shows available to a user is depicted 2600 in accordance with an example implementation. Any of the shows listed in the list 2602 may be selected and downloaded to the IOPCDs. In the current implementation, the Shows have all been processed for the number of IOPCDs in the IOPCD system. If an additional IOPCD is added then the Shows may have to be reprocessed. In other implementations, the processing of the Shows happens after selecting the show, but prior to downloading the Show.

It is noted that in some embodiments IOPCDs are depicted as ornaments, such as Christmas ornaments. But other SmartDeco devices may have the same components as the IOPCDs and function like IOPCDs, such as cake toppers, cake displays, balloons with displays, etc. It is therefore to be understood that all such other devices, such as other SmartDeco devices also comprise IOPCDs.

The content files associated with this Show include programming that indicates that this particular Show requires that a IOPCD System of 3 IOPCDs are required to play the Show properly. Further associated programming indicates that this content requires that the IOPCDs be oriented in real space in a triangular configuration with Ornament 1 on top and Ornaments 2 and 3 on the left and right below Ornament 1. Selecting this Show triggers the remote server processor to execute programming that queries the App to determine if the IOPCDs in the user's IOPCD System are both correct in number and orientation to properly play the Show. If so the remote server provides a prompt to the user confirming that the user's system is properly configured for the Show or if it is not the case that the user's IOPCD System is properly configured information is provided to the user regarding what corrective measures must be effectuated to make it so (e.g., another IOPCD must be added or IOPCDs must be moved as indicated, etc.). In the instant example the number of IOPCDs is correct as is their orientation. Upon engagement of an authorization for downloading of the Show content, the remote server transmits to the App three content files corresponding to the content that will be loaded differentially and specifically to the three subject IOPCDs. But first the content files are provided to the App where the user can engage the preview function. In some preferred embodiments a special Show preview screen function provides a segmented screen depiction of the three components of the Show content playing on one Show preview screen in addition to the individual segment previews that are available in the Playlist preview screen.

Turning to FIG. 7, an illustration 600 of the IOPCD 102 of FIG. 1 controlling an adjunct device 602 in accordance with an example implementation. The programing of the IOPCD 102 may be loaded from memory 604 on the adjunct device 602. The memory 604 is also connected to an adjunct processor 606 in addition to IOPCD 102 via bus 608. The adjunct device 602 and IOPCD 102 may be powered by power supply 610. The adjunct device 602 may have consumable material 612 that is electronically controlled 614 in response to the adjunct processor 606. Examples of such devices are an aromatherapy machine, fireworks launcher, video picture frame, message printer, to name but a few examples.

In FIG. 7, a flow diagram 700 of the operation of the IOPCD 102 of FIG. 1 in accordance with an example implementation is depicted. The IOPCD 102 is configured and physically placed in an IOPCD System use environment such as a holiday display in step 702. The IOPCD 102 is configured by a controller that identifies the location of the IOPCD 102 relative to other IOPCDs and the media that will be accessed via the cloud and/or locally or via a controller that accesses the media via the cloud and/or locally in step 704. In step 704 the IOPCD 102 and other IOPCDs located in the holiday display are operated in a coordinated Show.

Figure 8:
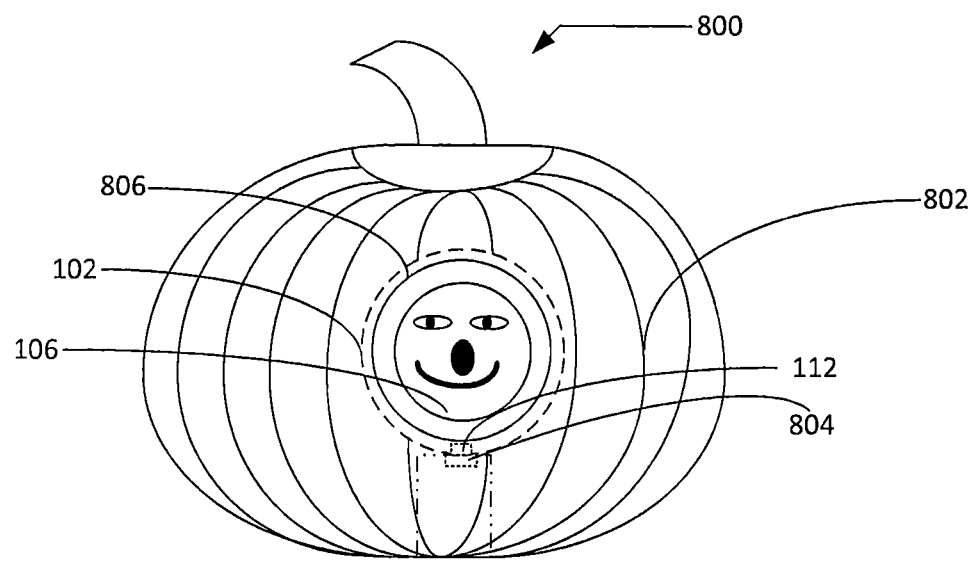
FIG. 8 depicts an interactive ornamental processor-controlled device of FIG. 1 disposed in a holiday shell enclosure in accordance with an example implementation.

Turning to FIG. 8, an IOPCD 102 of FIG. 1 disposed in a holiday shell enclosure 802 is depicted 800 in accordance with an example implementation. The IOPCD 102 may be coupled to the shell 802 with a data connector 112 that enables power and data to be passed through the shell 802 to the IOPCD 102. The IOPCD 102 has a display 106 that is viewable through an opening 806 in the shell 802. The shape of the shell is depicted as a pumpkin in the current implementation. In other implementations, other shaped shells for other holidays of events may be employed. In yet other implementations, other shapes or designs of shells may be used (e.g. college logos, political party symbols, etc.). In still other implementations the shell (also sometimes referred to herein as a "DecoForm") comprises wearable objects such as housings for wearable headsets. In some of such preferred embodiments two of the IOPCDs may be operably inserted into a headset housing whereby the location of the display screens of the IOPCDs provide an individual display for each of the user's eyes. In some of such embodiments the IOPCDs in such a housing provide the user with an effective VR headset-like device. In yet another configuration, a plurality of shells each having one or more IOPCDs that is(are) networked and controlled by a Conductor selected between the shells, or another device such as a cake controller may play a Show or other multimedia performance.

Figure 9:
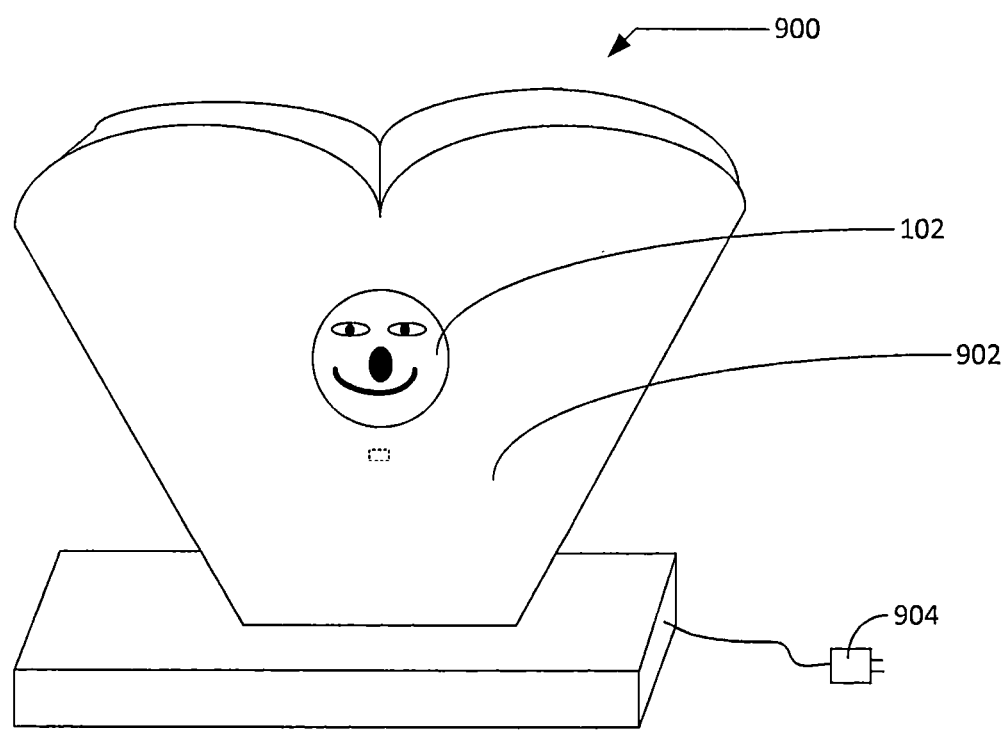
FIG. 9 depicts an interactive ornamental processor-controlled device of FIG. 1 in a shell stand having a power connector in accordance with an example implementation.

In FIG. 9, an IOPCD 102 of FIG. 1 in a shell stand 902 having a power connector 904 is depicted 900 in accordance with an example implementation. The IOPCD connects to the shell stand 902 with its data port 112 and receives power via the data port 112 from the power connector 904. The display of the IOPCD 102 is viewable through an opening in the shell stand 902. In the current implementation, the shell stand 902 is in the shape of a heart.

Figure 10:
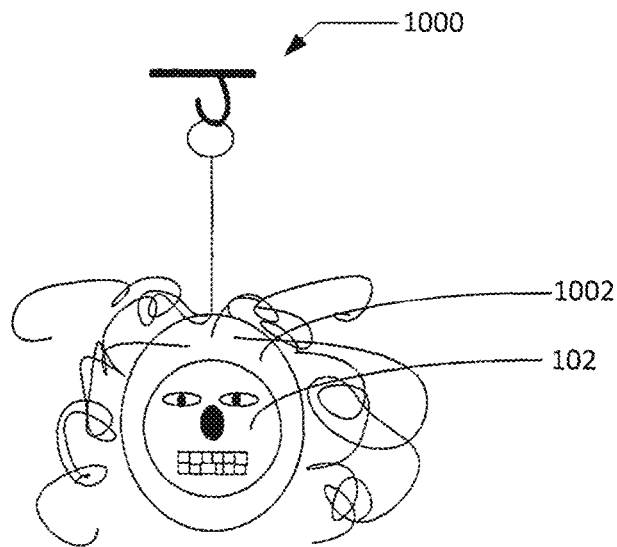
FIG. 10 depicts an interactive ornamental processor-controlled device of FIG. 1 in a decorative hanging shell in accordance with an example implementation.

Turning to FIG. 10, an IOPCD 102 of FIG. 1 in a decorative hanging 1004 shell 1002 is depicted 1000 in accordance with an example implementation. The IOPCD 1002 is view able through the hanging 1004 shell 1002. The shell 1002 is in a shape of a ghoul's head. In other implementation, other types of hanging shell decorations may be employed, such as for birthdays, anniversaries, holidays, and parties.

Figure 11:
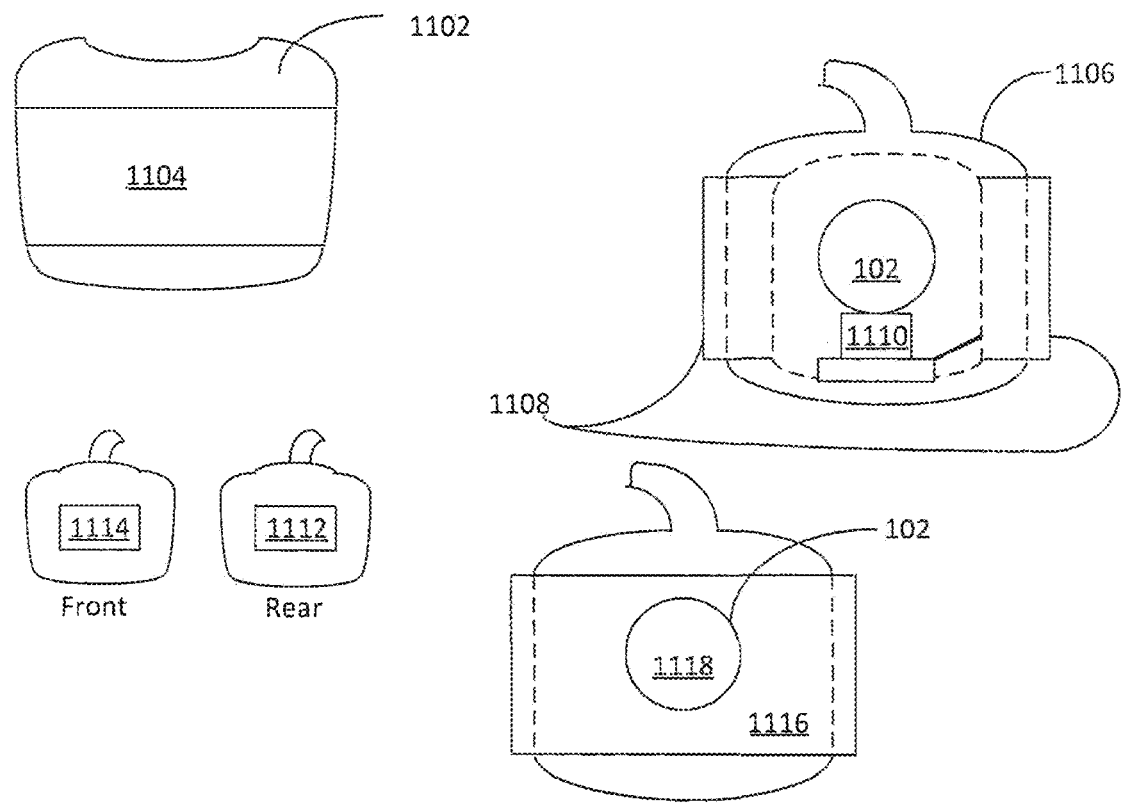
FIG. 11 depicts different shell configurations being driven by an interactive ornamental processor-controlled device of FIG. 1 in accordance with an example implementation.

In FIG. 11, different shell configurations 1102 and 1106 being driven by an IOPCD of FIG. 1 are depicted 1100 in accordance with an example implementation. Shell 1102 has an external screen 1104 that is coupled via a data port of the IOPCD and controlled by the IOPCD. Shell 1106 has multiple displays controlled by IOPCD 102 that is supported by a base 1110 coupled to the IOPCD 102 hand have circuitry to support the one or more displays 1108 on the exterior of shell 1106. It is noted that all of the shells may make use of the audio and networking capabilities of the IOPCD 102. The displays 1112 and 1114 may be disposed on opposite sides of shell 1106 controlled by IOPCD 102. In yet other implementations, a shell 1116 may have an opening 1118 for the IOPCD's 102 display in addition to exterior displays (one or more) on the shell, such as 1112 and 1114.

Figure 12:
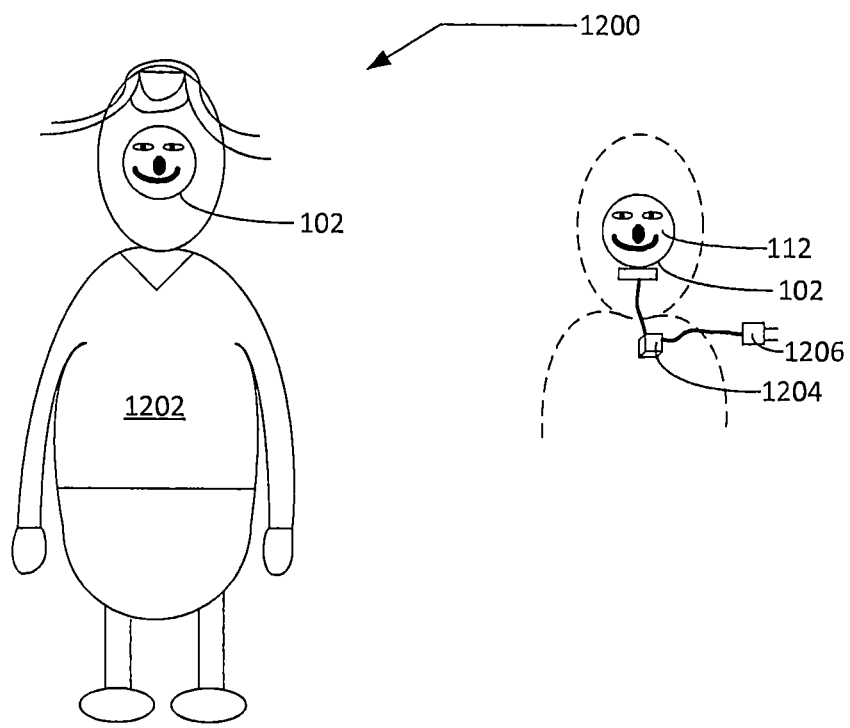
FIG. 12 depicts a doll with an interactive ornamental processor-controlled device of FIG. 1 providing a face to the doll in accordance with an example implementation.

Turning to FIG. 12, a doll 1202 with an IOPCD 102 of FIG. 1 providing a face on display 112 to the doll 1202 is depicted 1200 in accordance with an example implementation. The IOPCD 102 with display 112 is powered by a battery 1204 that can also be powered or recharged by connector 1206. The battery may be coupled to the IOPCD 102 via its data port.

Figure 13:
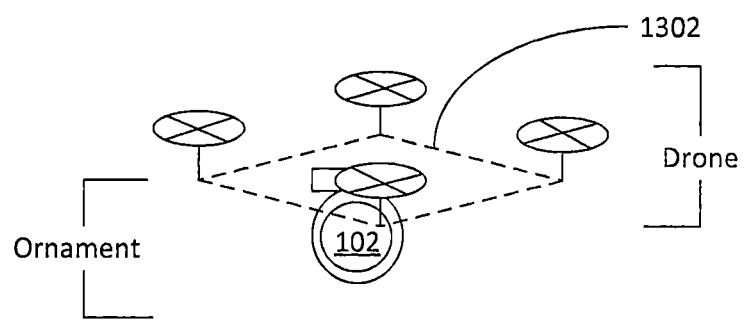
FIG. 13 depicts an interactive ornamental processor-controlled device of FIG. 1 coupled to a transportation device where the control of the transportation device is derived from the interactive ornamental processor-controlled device in accordance with an example implementation.

In FIG. 13, an IOPCD 102 of FIG. 1 coupled to a transportation device 1302 where the control of the transportation device is derived from the IOPCD 102 is depicted 1300 in accordance with an example implementation. The transportation device 1302 has a power source, such as a battery, that is able to power the IOPCD 102 via its data port. In the current implementation, the transportation device 1302 is drone. In other implementation, the transportation device may be a tracked vehicle, wheeled vehicle, fixed wing aircraft, boat, or similar device.

Figure 14:
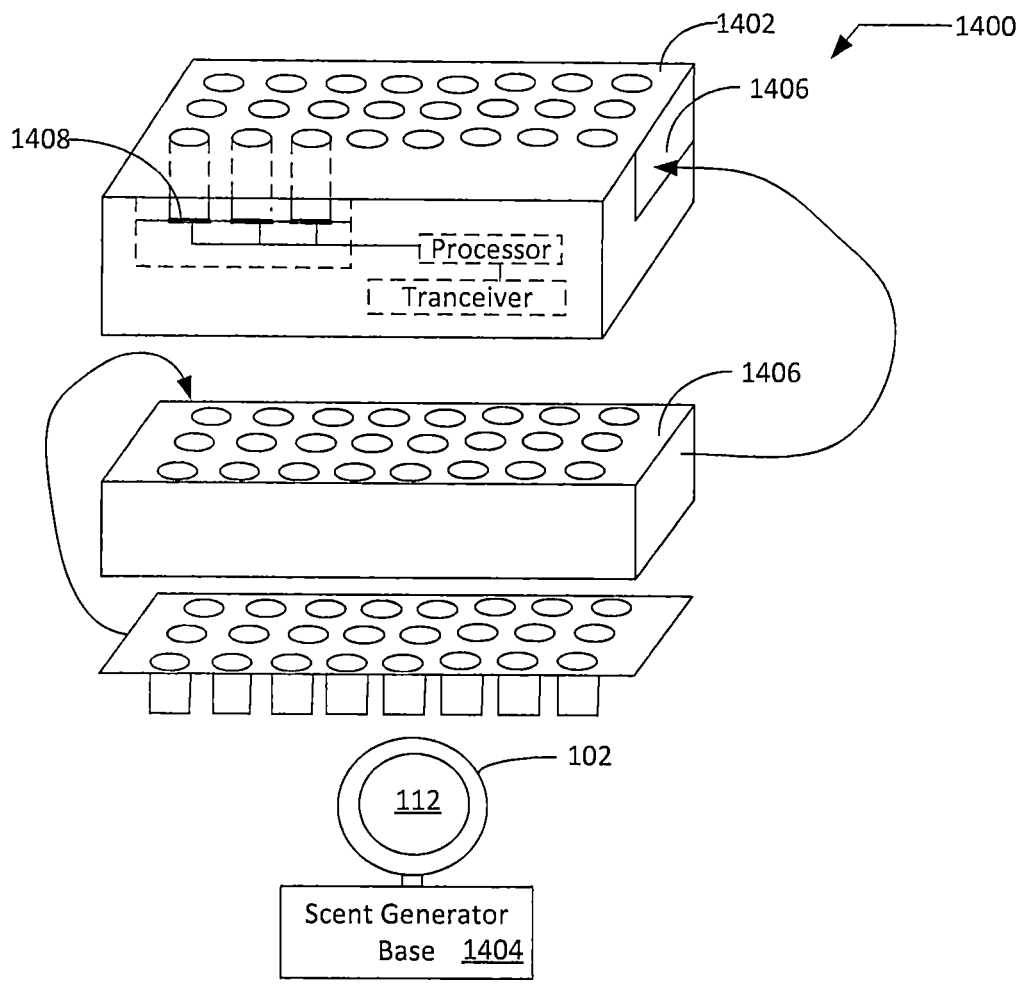
FIG. 14 depicts a scent generator controlled by an interactive ornamental processor-controlled device of FIG. 1 in accordance with an example implementation.

Turning to FIG. 14, a scent generator 1402 controlled by an IOPCD 102 of FIG. 1 is depicted 1400 in accordance with an example implementation. The IOPCD 102 has a display 112 that displays a user interface for controlling scent generator 1402. The IOPCD 102 is coupled to an input interface 1404 via its data port. The input interface 1404 enables a user to interface with the user interface. In the current implementation input interface 1404 has a plurality of buttons for yes, no, up down, right left. In other implementations, other types and number of buttons by be used. In yet other implementations, the input interface 1404 may be mapped to what is being displayed on a display 112 of IOPCD 102. It is also foreseeable that the scent generator 1402 may have a display or touch screen display coupled to the IOPCD 102 for input/output.

In some preferred embodiments, the scent generator 1402 has a scent cassette 1406 that contains a plurality of scents that are mixed in response to selections made on the user interface. The mixed scents are heated by a heating element 1408 creating a vapor that has the selected scent. As scents are used up in the cassette, the user interface will signal they are no longer selectable and at a predetermined time or use, signal the scent cassette 1406 needs refilling or replacing (depending upon implementation).

Figure 15:
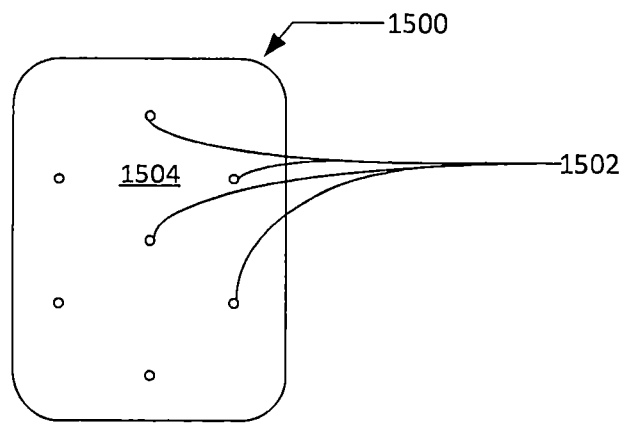
FIG. 15 depicts a reality show mirror with an interactive ornamental processor-controlled device of FIG. 1 in control of a camera and display of the reality show mirror.

In FIG. 15 a reality show mirror 1500 with an IOPCD of FIG. 1 in control of a plurality of cameras 1502 and display 1504 of the reality show mirror 1500. In the current implementation, a two-way mirror may be placed over the display 1504 controlled by the IOPCD. In other implementations, the mirror is actually a display 1504 acting as a mirror with the images captured by the plurality of cameras.

It is to be understood that a reality show mirror device also can comprise an IOPCD that can function in one or more IOPCD Systems. In some embodiments of the invention the reality show mirror may also be used in conjunction with AR devices. In some such uses the user can see persons and or places in association with the user's image. In some of such uses lessons, coaching, remote shopping, remote travel and remote services, such as those described in U.S. patent application Ser. No. 15/188,920 can be accomplished through and/or in association with such uses.

It will be understood and is appreciated by persons skilled in the art that one or more processes, sub-processes, or process steps described in connection with FIG. 7 may be performed by hardware and/or software (machine-readable instructions). If the approach is performed by software, the software may reside in software memory in a suitable electronic processing component or system, such as one or more of the functional components or modules schematically depicted in the figures.

The software in software memory may include an ordered listing of executable instructions for implementing logical functions (that is, "logic" that may be implemented either in digital form such as digital circuitry or source code or in an analog form such as analog circuitry or an analog source such an analog electrical, sound or video signal), and may selectively be embodied in any computer-readable medium for use by or in connection with an instruction execution system, apparatus, or device, such as a computer-based system, processor containing system, or another system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, or semiconductor system, apparatus or device. More specific examples, but a non-exhaustive list, of tangible computer-readable media, would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in computer memory.

Ornament Brain/DecoForms/Smart Environmental Ornamentation Devices ("SEODs")

To further elaborate upon the functionality of the IOPCD or SEOD, a further explanation is provided herein. Christmas tree ornaments have traditionally provided a singular decorative purpose, specifically tree ornamentation. Some ornaments, such as those described in U.S. Pat. No. 7,248,230 and/or U.S. Pat. No. 8,462,079 can display audio/visual content, provide coordinated content on their displays, and be controlled by applications on smartphones and the like. But the coordination is limited to playing at the same time the audio/visual content as if each ornament is a speaker connected to the same source. The present invention is directed to an ornamental system (also referred to herein as an "IOPCD System"), apparatus, and method that provides a broad spectrum of functional uses for such ornaments and similar devices ("IOPCDs", IOPCD Ornaments, Ornaments "G.A.P.Man Ornaments"). It is noted that the swappable shell and the ability to use the internal hardware and functionality of the SEOD to control other devices increase their utility beyond just one holiday and thus also increases the commercial benefit of the disclosed approaches.

The invention involves the use of "G.A.P.Man Ornaments" or "Ornaments" in association with enclosures and adaptive coverings ("shells", "G.A.P.Man DecoForms" or "DecoForms"). Embodiments of the invention, the G.A.P.Man Ornaments provide the processing and display components for the Ornament Enabled Enclosure ("OEE") or shell as well as the interface for wired or wireless communication with one or more control apps functioning on smartphones and similar devices (e.g., iPads and laptop computers). In other embodiments, the DecoForms also include input devices, such as microphones, cameras, and sensors (movement, heat, light gas, etc.). In some preferred embodiments, the DecoForms incorporate output devices, such as one or more display devices and one or more sound generating devices. In some embodiments, one or more displays are flexible or moldable and comprise a part of the exterior of the DecoForm. In some embodiments the one or more displays include a substantial part or substantially the entirety of the exterior of the DecoForm. For example, in some preferred embodiments of the DecoForm example above whereby two IOPCDs are configured into a DecoForm housing to produce a VR headset device, some or all of the outfacing (i.e., part not directed at the face of the user) parts of such DecoForm may include, have disposed on, or otherwise comprise a display screen to provide content that, in some preferred embodiments, is part of or otherwise coordinates with a Show or the content being viewed by a user of the DecoForm-AR headset device.

In some embodiments, special effects devices ("SEGs"), such as scent generators, smoke or mist generators, confetti expulsion devices, smoke or mist generators, projectors, light emitters (such as laser lights) are incorporated into or attachably connected to the DecoForm and are controlled by one or more processors in one or more DecoForm G.A.P.Man Ornaments. In some embodiments, the SEG comprises a motorized means of changing the external shape of the DecoForm. For example, in some embodiments, mechanical actuators controllably change a pyramid-shaped DecoForm into a cube-shaped DecoForm.

In yet other embodiments of the invention, one or more DecoForm Ornaments provide the controlling functionality for devices in which it/they are included or connectively associated by wired or wireless means. It is noted that the control of one or more components in the DecoForms, such as input devices, output devices, and special effects devices, is effectuated by one or more processors in one or more G.A.P.Man Ornaments contained within, or connectively associated with, the DecoForm. In other embodiments, the one or more processors are controlled by one or more Ornament control applications ("OCAs")

In some embodiments, one or more processors in one or more G.A.P.Man Ornaments contained within or connectively associated with a DecoForm are controlled by, and/or otherwise communicate with, one or more Ornament control applications ("OCAs") operatively functioning on or in association with a smartphone, a controller device, such as by a wand controller device, such as the drumstick/wand controller device described in U.S. Pat. Nos. 9,117,427, 9,502,012, and/or 10,089,971, and incorporated in their entirety here, computer and/or other digital devices capable of wired or wired communication with such processor(s). In some embodiments, the OCA(s) control(s) the input devices, output devices and/or SEGs incorporated into or associated with the DecoForm via control of one or more G.A.P.Man Ornaments contained within or connectively associated with a DecoForm. In some embodiments, the OCA(s) independently and/or directly control(s) one or more input devices, output devices and/or SEGs.

In some embodiments the DecoForm, alone or in coordination with one or more other DecoForms can be coordinated to interact with each other and/or one or more other G.A.P.Man Ornaments (e.g., ones not enclosed within or attached to a DecoForm) or other display or S.G. devices such as televisions, monitors, displays, projectors, "smart" picture frames, Virtual Reality ("V.R.") devices, Augmented Reality ("A.R.") devices, devices that incorporate screens (cakes, balloons, candles, etc., as such devices are described in U.S. patent application Ser. No. 16/690,087, filed Nov. 20, 2019 and incorporated by reference in its entirety herein), scent generators, smoke generators, confetti ejectors, pyrotechnic launchers, interactive toys, drones, mirror/display devices, including without limitation, Reality Show™ type mirrors) and other display devices, including without limitation those referenced in one or more IPDs (all the foregoing, and similar devices, collectively referred to hereinafter as smart environmental ornamentation devices ("SEODs"), to present coordinated audio, video, audio/visual, photographic, holographic, A.R., haptic, pyrotechnic and/or multimedia combinations of the foregoing. It is noted that the haptic feedback may include a mechanical device, such as a motor or solenoid controlled by the processor or secondary microcontroller that generates the vibration.

In some embodiments, a DecoForm, alone or in coordination with one or more other DecoForms can coordinately interact with external devices such as SEODs. In some embodiments, such coordination is effectuated through control means effectuated by one or more G.A.P.Man Ornaments contained within or connectively associated with a DecoForm, which, in some embodiments, are themselves controlled by one or more OCAs on one or more external devices (e.g., a smartphone, computer, wand controller, etc.)

It is to be understood that some embodiments of the current invention are directed to providing coordination of the G.A.P.Man Ornaments (a.k.a IOPCDs), DecoForms, and other devices such as SEODs with one or more V.R., AR and/or haptic devices. For example, one of the embodiments of the system described in this application provides a user with the ability to present a coordinated multimedia Halloween Show whereby the content (e.g., audio, video, haptic, holographic, textual, A.R., V.R., etc.) is coordinately presented on and/or in association with one or more G.A.P.Man Ornaments, DecoForms, and/or SEODs.

In some embodiments, the DecoForm also includes and/or otherwise comprises a powering means, such as a battery powering means, a wired power receiving means, an inductive power receiving means, and/or a solar cell power receiving means. In some embodiments, the DecoForm includes and/or otherwise comprises an air cooling means, such as by the operation of one or more included or associated electric fans and/or one or more air vents.

In some embodiments, one or more G.A.P.Man Ornaments are disposed in association with part or substantially all of the body of a toy doll, a simulated human skeleton, a monster creature, toy animal, a robot, simulation of a real or fanciful human, animal or other creature, or simulation of another object, whereby the one or more display screens of the G.A.P.Man Ornament(s) function(s) to provide, through the display of content on one or more respective display screen, a displayed face and/or other body part(s), clothing, external adornments, weapons, equipment, forcefields, etc. The power supply of the Ornament is preferably connected contained within the toy or doll. Further, sounds may be generated by the G.A.P.Man Ornament for the toy doll, such as talking, crying, singing along with the displayed content, such as facial expressions for talking, singing, crying, etc. In yet other implementations, the G.A.P.Man Ornament may enable interaction while functioning as a toy doll (or similar implementations). The microphone coupled to the processor in the G.A.P.Man Ornament captures sound and the displayed image responds visually and audibly to the sound generated or contained in memory, such as responding to the a question.

It is to be understood that one or more G.A.P.Man Ornaments (i.e., one or more IOPCDs) can function as a replaceable processing "brain" and control means for a large number of devices, such as robots, drones, toys, other G.A.P.Man Ornaments, etc. Thus, essentially, in some embodiments, a G.A.P.Man Ornament can function as a brain for many smart devices.

In some embodiments, the DecoForm comprises a scent generator. In yet some other embodiments, the DecoForm includes or is connectedly associated with one or more scent generators. In still other embodiments the DecoForm includes a scent detector. In some other embodiments, the DecoForm includes or is connectedly associated with a scent detector. The scent generator may include a heating element, fan, and one or more scent-carrying/containing replaceable media. The electrical components may be activated by the processor or an associated microcontroller. More than one scent may be on the scent-carrying media and may be combined to make one or more new scents.

Some specific, but not limiting, embodiments of the configurations and associated functionality of DecoForms are (i) pumpkin DecoForm, (ii) a heart-shaped DecoForm, (iii) a shrunken head-looking DecoForm, (iv) a doll-shaped DecoForm, (v) a bowling ball DecoForm, (vi) a basketball DecoForm, (vii) a soccer ball DecoForm, (viii) a football DecoForm, (ix) a helmet DecoForm, and (x) interlocking "Lego®-like" DecoForms that can be physically connected to each other, (xi) nightlight DecoForms, and (xii) flying drone DecoForms. Without limiting the foregoing, in some preferred embodiments the IOCPD is associated with a hooded ghost DecoForm whereby the IOCPD is disposed in the hood, in the location, for example, where the ghost's head or face (or lack thereof) would normally be located. The hooded ghost then could play video and/or audio content contained in a ghost Show that is downloaded to the G.A.P.Man Ornament. It is to be understood that conversational interactivity similar to that described in association with the doll DecoForm above is not limited to doll DecoForms or doll-like Decoforms but instead is to be understood as a feature could be integrated with a wide variety of DecoForms, including for example the ghost DecoForms described above.

As indicated above, in some embodiments, a DecoForm comprises a nightlight configuration of a G.A.P.Man Ornament and nightlight functionality. In preferred embodiments, there is at least one IOPCD attached (by docking) to a nightlight assembly plugged into a wall socket. In some embodiments, the Ornament display can be the means or one of the means of controllably providing the light. In some embodiments, the nightlight assembly includes a scent-generating device. In other embodiments, the DecoForm is configured with an attachment means to enable multiple DecoForms to be physically connected to each other. In this way, a display array can be created that can coordinately present content on and among the physically connected DecoForms. It is noted that in yet other embodiments, the DecoForm comprises a drone.

In some instances, the IOPCD has the power and/or data port at the top. In some embodiments, the top feature (e.g., where the hanger attaches to) is removable to reveal a power/data port assembly to mate with a DecoForm. For example, this allows the plugging in of the ornament upside down onto a male post in a DecoForm such as a pumpkin shell with a porthole for the Ornament screen to be visible. But inversion of the IOPCD means the display will be upside down. Therefore, in some preferred embodiments the App with which the DecoForm and interfacing IOCPD are paired provide functionality to provide the user with controls that enable the rotation of the content displayed on the one or more displays of the IOPCD(s) and/or DecoForms affected by such inversion issue. In other implementations, the orientation of the IOPCD may be detected by a mechanical switch with liquid, gravity switch, accelerometer, or other moving elements (such as a metal ball).

Furthermore, mirrors reverse our image, so we do not see ourselves as others see us. There is a need to provide an accurate image of ourselves to create a look we desire others to see more effectively. Some preferred embodiments of the invention comprise a combination of one or more cameras disposed into the body of a display so as to be as inconspicuous or invisible as possible. The camera(s) capture and transmit to a processor visual information that is then digitally modified and displayed as a "corrected" image showing a user a non-reversed image, thereby producing an effect of a mirror that reflects a non-reversed image.

In some embodiments, the reality show mirror ("RSM") controlled at least partially by the SEOD, can mix into the live camera content recorded or live content from third parties. It is enabling, in some embodiments, a person to receive a real-time make-up lessons or other types of lessons via the RSM. It is to be understood that the RSM provides to the user an image of the user generated from one or more cameras indicated in FIG. 15. In other embodiments, the RSM interacts and/or coordinates with G.A.P. Man Ornaments, G.A.P.Man Shells and/or SEODs (e.g., to produce a coordinated multi-display show or presentation).

It is also to be understood that the RSM depicted in FIG. 15 comprises a device capable of videoconferencing and therefore contains the required processor(s), online networking, powering and other components that are understood by persons of ordinary skill in the art to effectuate videoconferencing by means such as by smart phones. Additionally, the FIG. 15 depicts one or more cameras disposed into, on or below the display of the RSM. This configuration enables a user to engage in a videoconference call and look into a camera disposed at eye level so that the person at the other end of the videoconferencing call will see the person looking into the camera. This solves the problem commonly experienced where a person does not look into the camera disposed above, for example, a display screen of a videoconferencing device and does not, therefore, appear to be looking at the person with whom the call is being effectuated. In some embodiments, the RSM captures the user's image and electronically reverses the image on the display enabling a person to see how they look to other persons. This solves the problem of persons only being able to see a reversed image of themselves in conventional mirrors. Thus, by displaying a reversed image of the user the reality show mirror "shows" the user a more approximate "reality" of what the user looks like to others.

A general description of an example embodiments one or a group of Ornaments' functionality is an interactive content display device usable on Christmas trees as a tree ornament and in other locations to provide a means of digitally displaying audio-visual content supplied to the device directly or through the use of an associated control App ("App"). The Ornament functions as a stand-alone content display device or as one of a number of Ornament devices configured to operate in a coordinated manner to produce a unified content presentation involving a plurality of Ornamentor third-party devices. The Ornament is designed to operate as a hanging ornament on a Christmas tree, on a table or other flat surface with the use of an included stand, or as a device to be contained within another external structure.

An objective of the external look and feel of some preferred embodiments of IOPCDs intended to function as Christmas Ornaments that inform their general overall design is the creation of an ornamental product that does not look obtrusive or out of place hanging on a typically adorned Christmas tree. In some preferred embodiments, the IOPCD Ornament will be aesthetically designed to look like a typical Christmas tree ornament except for the outward facing video display. To that end, the non-display outer surfaces of the current implementation provide (i) excellent light reflectivity to reflect light generated from traditional Christmas tree light sources likely to be adjacent to the device and (ii) maximally conceal cooling vents, sound ports, and body part junctures. The Ornament will therefore have a highly polished or metallic-looking external surface and appropriate filigree or other external means to provide the concealment described in (ii) above. In some preferred embodiments, air vents to cool the IOPCD are disposed in one or more places in the body of the Ornament around the display. In some embodiments, the vents are concealed by a decorative lip around the display that is affixed to the body of the Ornament elevated above the surface of the body in a manner that frames the display but provides a space between the body and the lip to allow air to flow through air vents disposed in one or more places around the display.

In some preferred embodiments, the external configuration of the Ornament will be a hemispherical orb or approximately hemispherical orb. In some preferred embodiments the external configuration of the Ornament is a sphere. It is to be understood however that the external configuration of the Ornament can be a very broad range of shapes including without limitation shapes described in U.S. Pat. No. 7,248,230 and/or U.S. Pat. No. 8,462,079. The "neck" portion of the Ornament in some embodiments, such as when its configuration is styled in the shape of a traditional Christmas ornament, will comprise a detachable ratcheting hanging system that enables the user to turn the Ornament at the casing attachment point to the hanger member so that the user can orient the Ornament's display side as desired, and fix that position in place, when the Ornament is hung with a rigid ornament hanger. The orientation ratcheting component will provide a turning option of −/+120 degrees. The digital hanging apparatus will securely plug into a port on the top of the Ornament body and will include at the plug-in end a male power/data input port jack, and oppositely, a female power/data input socket disposed on the back of the digital hanging apparatus.

The display of an embodiment of the Ornament may be a high quality, high definition, very low failure rate circular display capable of processing and displaying no less than 30 fps with a screen diameter as close to 3.34 inches as possible but no less than 2.47 inches. In other implementations, other display shapes and sizes may be used. The display of an implementation may be compatible for use with a Raspberry Pi (i.e., RASPBERRY PI™ 3 Model A+) single board computer, or microcontrollers, for example a PIC microcontroller.

In some preferred embodiments the IOPCD is able to generate non-distorted sound at maximum volume settings with sufficient amplitude to be easily heard at a distance of 20 feet from the device at maximum volume with low level competing background noise (e.g., conversation in the room). In preferred embodiments the sound volume for each Ornament is individually controllable and mutable via the App. In some preferred embodiments a separate control function is included in the App the enables the consumer to simultaneously mute and unmute ALL Ornament devices linked to the App or a selected subset thereof.

In some preferred embodiments the IOPCD is configured to display and perform video, photographic, textual and sound content provided to IOPCDs in the IOPCD System under the control of the App from one or more of the following sources:

1. content stored on the device running the App (e.g., the user's smart phone, tablet or other App enabled computer), such as content stored in a smart phone's photo library, video library, voice memos, notes, other apps, etc.;
2. content stored on remote content storage locations such as online accessible content servers,
3. content stored on remote servers that are enabled to provide content to IOPCDs directly, including without limitation for the purpose of to promoting a product or service by the display of the content through the playing of such content as one or more Playlist Segments automatically integrated into one or more Playlists for one or more IOPCDs in an IOPCD System;
4. remote server-stored content in file formats commonly used for downloadable or streaming content from remote servers through the use of commonly used browsers (e.g., Safari, Explorer, Firefox, etc.), such as the streamed playing of content on one or more IOPCDs from a streaming content source such as YouTube or other streaming video source, directly or from a temporary copy cached in the App or on one or more IOPCDs or one or more remote servers associated with the IOPCD System; and 5. content provided by a computer directly into one or more IOPCDs via direct wire (USB) means (through the power/data input dock disposed on the top of the orb or in the DHA) or via wireless means (e.g., WiFi or Bluetooth®).

Playlist Control Panel page Playlist Control Panel page. In some embodiments, content acquired for display on the Ornament that is not automatically transmitted to the control device's native "photographs/videos" app. that is accessible by the App is automatically transmitted to the Ornament device's onboard storage and the file name is added to a browsable directory of files stored in the Ornament device's onboard storage. These files may also be copied (via the engagement of a file name-associated icon) to the App, specifically to a browsable directory of files stored in the Ornament App's onboard storage. In some embodiments, such directories have "Remaining Storage Space" indicators and a file deletion function with associated icon to trigger that function on the page on which the subject browsable directory is displayed.

In some embodiments, the Ornament devices are able to emulate the "mirroring" mode of IOS and Android devices. In effect, an Ornament displays on its display screen what is displayed on the control device (e.g., Smartphone or tablet).

In some preferred embodiments the IOPCD is individually addressable and able to send and receive data from IOS and/or Android operating system smart phones. The addressability of the IOPCD may be implemented as unique id assigned to each IOPCD, such as an IP addresses, IOPCD serial number (that is reported to the App during setup), or identifier assigned by the App. The assignment may be stored in a database or static memory in some implementations.

In preferred embodiments, the IOPCD Ornaments are capable of networking and coordinating with the other IOPCD Ornaments linked to the same App instantiation on the consumer's smart phone or other control device. The networking and coordination features of the Ornament in preferred embodiments provide functionality to perform "Shows" that comprise different, but synchronously coordinated, content components displayed on separate IOPCD Ornaments. For example, if a consumer has purchased three Ornament devices, for example, the App and IOPCD System will enable the consumer to
1. Sync each Ornament device to the downloaded App on the consumer's IOS or Android control device (such as a smartphone or tablet);
2. Provide device orientation information to the App regarding where the IOPCDs onboarded to the IOPCD System are located relative to each other;
3. Import specific show content elements (such as video files) into the App (or directly to the 3 devices by means controlled by the App) that comprise appropriate synchronized and coordinated display components for the display of the show on the 3 devices (this feature requiring a means of coordination between the App and one or more remote servers storing "show" content material to "pull" from the server the appropriate version of the show for the Ornament device configuration in use, e.g., here, 3 units); and
4. Play the Show synchronously on the 3 Ornaments.
5. An example of the foregoing would be a series of video images of small animals displayed on three Ornaments seeming to jump from one Ornament to another resulting from the synchronized playing of three video files on the three Ornaments.

The coordination features of the current implement of the Ornament include a means to provide the consumer, through an selection option on the App, the ability to make the playing of a show continuous by looping, play once, or play a specific number of times. The coordination features also include a means to select some but not all of a plurality of Ornament devices (e.g., on a tree) to participate in a show. A consumer that has, for example, six Ornament devices hung on a Christmas tree, is provided an option (through the App) to select how many and which of the devices will be used in a show. Corresponding functionality for the required components of the system (e.g., the App and content server) to recognize the choice of number of devices. Functionality in the current implementation of the Ornament is provided so that if a consumer has hung six Ornament devices on a tree, for example, and subsequently the consumer selects a 3-Ornament device show for display, any sound being generated by the other closely located (e.g., on the same tree) Ornament devices not participating in the show display are automatically muted when a show is playing and then return to their previous state (e.g., playing video and sound) when the show has concluded (unless the show is on a loop, in which case the muting of the non-participatory show Ornament devices would remain muted until such show was unlooped.

In preferred embodiments of the invention the Ornaments are compatible with the most common IOT protocols for communication with toys, greeting cards, and other external devices referenced in the U.S. Pat. Nos. 7,248,230 and/or 8,462,079 and incorporated by reference herein. In some preferred embodiments, the networking capabilities of the IOPCDs enable IOPCDs linked to related apps on different smart phones that are remotely located from each other to communicate directly and/or through the associated Ornament system control App. This feature enables remote located Ornaments to have Ornament communication functionality such as live video camera transmissions from one Ornament (equipped with video capturing capability) to a display receiving the transmissions on one or more remotely located Ornament devices.

Some preferred embodiments of the invention include an Ornament system control application designed to simply and intuitively control a large number of IOPCDs, such as IOPCDs and other compatible third-party devices in the current implementation.

In some preferred embodiments the App includes some or all of the following controls:
1. A functioning "back arrow" icon that takes the user to the previous page.
2. A System Volume/Mute slider/button dual icon to control overall system volume (slider part of the icon) and provide a fast and easy way to mute the system sound generators in the Ornament devices (via the mute button part of the icon). When the mute button part of the icon is engaged (i) the system sound volume is muted and (ii) the mute button part of the combination icon blinks on every page it is displayed on.
3. Individual Ornament or IOPCD volume and brightness controls.
4. A functioning dropdown menu icon that generates a list of functional links to the following App locations:
    a. "Home" (link to home page);
    b. "Add a Device" (links directly to the "Add a Device" page);
    c. "Device Location/Orientation" (links directly to the "My Ornaments Locations/Orientation" page);

d. "Gifts" (a "Gifts" page where controls pertaining to gifts-received, gift redemption and gift-giving functions);
e. "Special Features" (links to a page in which special features such as a clock display application may be instantiated and otherwise controlled);
f. "Store" (comprising a link to one or more online locations where content and other products and/or services may be accessed, ordered, purchased, downloaded, etc.;
g. "Trouble shooting" (comprising a link to the troubleshooting section of the online manual and/or other technical support features associated with the App);
h. "User Manual" (comprising a link to the user manual which in some embodiments may be online, in the App or a combination of both);
i. "Terms of Use/Licenses/Privacy Policy" (comprising a link to one or more pages that provide, or provide links to, terms of use, licenses, a privacy policy, credits, and/or other documentation; and
j. "DMCA Notice" (linked to a DMCA notice and reporting page).

In some embodiments the App Home/Navigation page conveys the App's intuitive navigation/structure and provides the following non-limiting examples of engageable "go-to" icons with the associated notations:
a. The "My Ornaments List" or similar icon will take the user to a page that enables the user to access information regarding the IOPCDs linked to the App. and to add and remove IOPCDs from the IOPCD System.
b. Individual IOPCD icons on the My Ornaments List page provide the user with clickable access the Playlist page for each Ornament device on the IOPCD System.
c. Engagement of the "Location/Orientation of My Ornament Devices" or similar icon will provide the user with access to the page on which the user can provide information to the App regarding where the IOPCDs in the IOPCD System are located in the use environment (e.g., where each is on a user's Christmas tree, etc.)"
d. The engagement of the "App Content Browser" icon or similar enables the user to access content stored in the App that is available for use on the IOPCDs
d. A "Notifications" icon provides the user with notice of when a gift has been received or there is another communication for the user to review.

In some preferred embodiments the App automatically creates and associates with each IOPCD or other compatible device added to the IOPCD System a unique alphanumeric identifier or other unique identifier that automatically appears as the next entry in the list that when the device is paired with or otherwise "onboarded" to the IOPCD System. In some preferred embodiments the App also provides a user option to customize each name in the list. In some preferred embodiments this function is activated by click and hold means (similar to the way one moves icons on an iPhone). In some preferred embodiments, each listed item is also automatically linked to its corresponding separate Ornament Playlist Control Panel for the specific individual device listed. When the listed item is clicked, an active Ornament Playlist Control Panel page for that particular device is displayed and enabled. In Some preferred embodiments above and/or below the device list on this page the following instruction or similar is generated and displayed by the App: "Click on a device listed below to go to its Individual Ornament Playlist Control page. Click and hold to rename."

In some preferred embodiments the foregoing controls and other features are displayed on and controlled from the "My Ornaments List" page.

In some preferred embodiments the App includes a "Location/Orientation of My Ornament Devices" page (which may also be referred to as the "Arrangement" page.) In some preferred embodiments this page provides the controls for providing information to the system regarding the orientation of the Ornament devices with respect to each other. This page also provides control over the functionality to provide graphical manual placement of icons corresponding to the system-recognized Ornaments on a Christmas tree (or other environment) graphical display generated by the App to enable the user to configure the Ornament icons on the tree graphic (or other environment graphics, such as a "room" template) in correspondence with the relative positions of the Ornament devices on the user's Christmas tree (or other provided environment template). In some preferred embodiments the "Location/Orientation of My Ornament Devices" or "Arrangement" page automatically displays the following: (a) a listing of Ornament icons corresponding to the IOCPDs paired with or otherwise onboarded to the IOCPD system with the current name or other identifier displayed in association with respective IOCPDs, (b) a graphical icon labelled "My Environment" that enables the user to select the environment in which the Ornament devices will be placed via a dropdown menu that lists environment templates such as, without limitation, "Christmas Tree", "Desk or Table", "Room", "Hanging" and "Other", and (c) a camera icon which when engaged provides the following instruction/notice or similar: "Click to take a picture of your Christmas tree or other environment for use to orient the locations of your Ornament devices." In some preferred embodiments, when the camera icon is clicked, the camera on the device on which the App is running (e.g., an iPhone) is accessed. Further, in some preferred embodiments when the user engages this function, and the control device's camera is engaged, a guideline aid appears overlaid over the device's display of the live feed from the device's camera. The guideline aid comprises and denotes the "safety" boundaries that the App's software will recognize for the inclusion as the foundational area that will used for the system to determine the user's Ornament device orientation relative to one another after the user has moved the Ornament device icons from the associated vertical list (where they automatically appear after pairing with the system) to their relative "place" on the graphical representation of their tree (or other environment). In some preferred embodiments addition to the guidelines a notice is displayed in association with the guidelines that is oriented to the type of environment chosen from the dropdown menu. In some preferred embodiments the default choice for the Arrangement environment is "Christmas Tree" and the notice provided may read "Make sure all of your Christmas Tree is located within the guidelines before you snap the picture." In some preferred embodiments the following instruction or similar is displayed: "Drag and place each Ornament icon in the list to the place on the tree image that corresponds to where the Ornament device is located on your tree."

Ornament Playlist Control Panel Page. In preferred embodiments of the invention a separate Ornament Playlist Control Panel page is created for each IOCPD linked to the App. In preferred embodiments an IOCPD onboarded into the IOPCD System plays and otherwise executes the files and control commands listed in the Playlist. In preferred embodiments the Playlist is displayed and controllable on the Ornament Playlist Control Panel page associated with the IOPCD and the App plays the content and executes control functions in the order and subject to controls indicated in the Playlist.

In preferred embodiments of the invention App includes functionality for creating and controlling content and instruction performance repetition (e.g., "looping"). In some preferred embodiments the Ornament Playlist Control Panel page includes controls for content file performance looping functions. In some preferred embodiments the App includes controls for looping the performance of a Playlist item (e.g., a "Playlist Segment" comprising for example, without limitation, a content file, an instruction, etc.) in the Playlist that will let the user select the number of times the Playlist Segment will play before the next Playlist Segment in the list is played. In some preferred embodiments the control of the number of times a Playlist Segment is performed or looped is selected from choices available in a drop-down menu of loop options, such as, 1×, 2×, 5×, "continuous", "Other", etc. In some embodiments of the invention when "Other" is selected, the App displays a page that enables the user to enter a specific number of play repeats.

In some preferred embodiments App provides the user with the ability to control the looped repeat of the entire Playlist. For example, a "Loop Playlist" icon may be included in association with the display of the Playlist. If the "Loop Playlist" icon is engaged, the listed files will play in the order listed and repeat for the number of times selected or continuously if that option is selected. In some preferred embodiments when the "Loop Playlist" icon is selected, a drop-down menu will display that allows the user to select 1×, 2×, 5×, "continuous" or "Other." In still other preferred embodiments, the "Other" option associated with the entire Playlist repeat control comprises a link, which if selected, opens a page that enables the user to select the number of times the entire Playlist will repeat.

In some preferred embodiments, a Viewer Window is located toward the top of the Ornament Playlist Control Panel page to enable users to view selected Playlist Segment content. In some preferred embodiments, file selection for play in the Viewer Window is accomplished by clicking a "Play" icon located in close association with the Playlist Segment that identifies the file name for that Playlist Segment or a "Play" function control in a Transport Bar that may be included directly under or otherwise in close association with the Viewer Window. In some preferred embodiments the Transport Bar contains active icons to control play, stop, rewind, fast forward control of the currently selected Playlist Segment media file playing.

In some preferred embodiments, an "Add Playlist Segment Content" icon is provided in the App which, when engaged, will trigger functionality that creates a new Playlist Segment and opens up a Content Source browser page that enables the user to select content for the new Playlist Segment from any of the content sources accessible through the App or one or more IOPCDs.

In some preferred embodiments of the invention Playlist Segments are depicted in the App as rectangular box icons containing a number of active icons within them. In some preferred embodiments each Playlist Segment contains touchscreen icon that enables a user through the touching and movement of the icon to move the subject Playlist Segment to a different location in the ordering of the Playlist Segments in the Playlist. In preferred embodiments the Playlist Segment "Move" control icon is located adjacent to the name of the Playlist Segment and graphically displays a finger grip able texture. In preferred embodiments of the invention a Playlist Segment icon is generally linked to a content file located in the App, but in some embodiments the file may be located in the memory of one or more IOPCDs associated with a Playlist, a content file located on the control device (e.g., a photograph or video stored on the control device in association with a native app), and/or recorded or live streaming content from a web source identified by the associated URL (which when such a URL is entered as a Playlist Segment, the App will effectuate an online connection to the subject source and direct the recorded or live streaming content to the IOPCD device associated with the Playlist. In some preferred embodiments a "Play" button is provided adjacent to the Move icon, and when engaged, will play the Playlist Segment's associated content on the Ornament device and in the Viewer Window.

In some preferred embodiments the name of the Playlist Segment is initially defaulted to be the name of the content file and such name is displayed adjacent to the aforementioned "Play" button. In preferred embodiments the Playlist Segment name is editable. Data entry for custom re-naming of a Playlist Segment is effectuated through a pop-up keyboard and voice recognition-based means similar to text generation functionality in the iPhone. The Playlist name editing/renaming function is activated when the Playlist Segment name area in the Playlist Segment icon is touched and held. In some preferred embodiments an edit button icon, is provided adjacent to the Playlist Segment name, which, when engaged will open up the Editor page.

In some preferred embodiments an "Active" checkbox is provided adjacent to the Playlist Segment box, and when the checkbox is checked, the Playlist Segment will be included in the playing of the Playlist. Unchecking the box will result in the Playlist Segment to be skipped during the Playing of the Playlist. In some preferred embodiments a "Loop" button icon is also provided and when engaged the "Loop" button icon lights up and causes the content in the Playlist Segment to loop the number of times selected (to set the loop repeat frequency please see the discussion above regarding Playlist Segment looping).

Default State Content Display Selection. In some preferred embodiments of the invention each Ornament Playlist Control Panel page includes an icon control button for accessing Default Mode Controls. These controls will allow a user to select the content that will display on the Ornament device if the device enters a predetermined default state. For example, if a non-repeating Playlist has been completed (a default state trigger) pre-selected content, such as a photograph will display on the Ornament device controlled in by its associated Ornament Playlist Control Panel page.

Editor Page. In some preferred embodiments the App includes an Editor page that provides users with features that enable users to edit content files that will become or which already are Playlist Segments. In some preferred embodiments the App's editing features will initially be very basic but will grow in number and sophistication over time. Consequently, notwithstanding the basic editing features provided in the current implementation.

Engagement of the "Edit" button icon in a Playlist Segment will open an Editor page for that Playlist Segment and the content file to which it pertains. In some preferred embodiments the editing features include without limitation content play length trimming In some preferred embodiments a sound volume modification feature is provided that enables a user to raise or lower the sound volume for a Playlist Segment and save the resulting sound volume-edited version. In some preferred embodiments a filter overlay editing feature that enables users to functionality create video or photographic layering effects, such as by combining 2 video or photographic content streams or by applying a filter to the video or photograph, is provided. This feature will enable a user to combine a "background" layer video comprising user content (e.g., a depiction of a user's dog running) with another video or video effect, such as a falling snow filter. For example, a "snowing" overlay filter edit can provide an effect that makes the content in Playlist Segment to which the filter is applied appear to be a depiction that includes snow falling.

Scan-based Recognition of IOPCDs. In some preferred embodiments the App and firmware provides for scanning recognition of IOPCDs and other devices configured to run with the IOPCD System. This involves the display of a QR code or bar code (plus the alpha numeric code for manual inputting of pairing-initializing data) on the subject Ornament display screen that can be scanned through the use of a provided scanner in the App. A successful scan will result in the recognition of the subject Ornament device by the App, initial communication between the App and the commencement of downloading initial files and initial free content to the device. Recognition and paring with a local WiFi system via Bluetooth Bonjour or other means known to persons of ordinary skill in the art for recognizing and paring Bluetooth or similar means. In some preferred embodiments of the invention the App also provides a fail-safe back up pairing option that comprises functionality to enable a user to manually input the Ornament identification codes (bar codes, QR code, manual numerical input, etc.) capability as a backup to scanning recognition functions.

Mirroring. In some preferred embodiments the App provides functionality to enable the "mirroring" of the control device (e.g., an iPhone or iPad) on the Ornament device display.

Additional Memory Access Feature. In some preferred embodiments IOPCDs have memory onboard. In some embodiments all of onboard memory will not be initially accessible by users. Some or all of such initially user-inaccessible memory can be "unlocked" by users through a "memory upgrade" enhancement feature. In some preferred embodiments this feature is associated with the "Store" access part of the APP. In still other preferred embodiments, the App provides a prompt feature that notifies the user if the user is approaching the limit of storage currently available on the IOPCD. and further provide notice to the user regarding the availability of additional memory availability.

In some preferred embodiments the sound conflict among IOPCDs in an IOPCD System is resolved by the user setting which Ornaments are "Conductors" and which are "Players" which in turn enables the App to direct the functionality of the Ornament system to play sound only on selected Ornaments. In such embodiments the Ornament system uses a changeable preset status system whereby when the system detects that there is a plurality of Ornaments in the system (e.g., on pairing), i.e., this means there is an "Arrangement" or plurality of Ornaments paired in the user's IOPCD System controlled by the App. In some such embodiments the user must designate which Ornament will be the Conductor, and the system will then make all other Ornaments in the Arrangement, Players. In such configuration sound is only generated by the Conductor except when a "Show" is played on the Ornament Arrangement. "Show" content is content that is coordinated to be played on a plurality of Ornaments. Show content can be programmed by the user or shows can be downloaded onto the Ornaments. In preferred embodiment, content is distributed to respective Ornaments in the Arrangement in accordance with their location so that the Show plays correctly. As indicated earlier location of the Ornaments relative to one another are determined by the system either automatically or by the user moving icons on the screen of a device running the App to put them in relative position to one another on the graphic representation which in turn is used by the App to provide to the system relative location information.

In some embodiments coordination of Ornaments in an Arrangement is effectuated by simultaneous start of content by and under the control of the Conductor. Thus, the processor in the Conductor Ornament gets information regarding which files are supposed to be on the Ornaments participating in the show in accordance with data included in the files for the Show content. When a show is downloaded to a system and the instructions to play the show are entered into the Playlist for the Conductor, the Conductor checks to be sure it and all the Player Ornaments have the requisite files. If so, the Conductors ready to issue simultaneous start instructions to itself and to the Player Ornaments when the Show item is reached in the playing of the Playlist on the Conductor. It to be understood that when Show content is on a Player Ornament and a Show has commenced, the Playlist playing of items on all Player Ornaments participating in the Show are preempted for the duration of the playing of their respective parts (the Show files) and then, when the Show has concluded, the Players pick up where they left off in the Playlist and play the next item in their respective Playlists.

The user may override the Conductor's sound play exclusivity monopoly. In embodiments of the invention controls for setting this and other sound conflict resolution options are presented. For example, the user could select an option where all Ornaments in an Arrangement play sound. In other embodiments the user could select, e.g., via a display option in the App regarding the control of an Ornament or IOPCD, the ability to select "sound on and sound off" thereby effectuating under user control which Ornaments will play sound. In other embodiments of the invention, sound conflict detection and automatic resolution options (such as some of the options presented above) are available to the user for selection.

It is to be understood that the functionality described in the App is performable on the Ornaments and IOPCDs, such devices are provided with the means to effectuate such functions under App control by appropriate means understandable by persons of ordinary skill in the art.

It is to be understood that functionality referred to herein regarding Ornaments shall be deemed to also apply in some embodiments to IOPCDs and other SmartDeco devices and by interactive masks and other devices described in one or more IPDs.

The foregoing detailed description of one or more embodiments of the approach for a holiday show involving one or more IOPCDs has been described. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

It will be understood, and is appreciated by persons skilled in the art, that one or more processes, sub-processes, or process steps described in connection with FIG. 7 may be performed by hardware and/or software (machine readable instructions). If the approach is performed by software, the software may reside in software memory in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for conductor and member interaction decorations has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method of providing a multimedia show, comprising:
   displaying a first element and a first background on a first display of on a first interactive processor-controlled device;
   displaying a second background on a second display of a second interactive processor-controlled device;
   calculating a virtual delay for the first element to leave the first display of the interactive processor-controlled device and enter the second display of the second interactive processor-controlled device; and
   delaying the appearance of the first element after it leaves the first display of the first interactive processor-controlled device for a period of the virtual delay prior to the first element appearing on the second display of the second interactive processor-controlled device.

2. The method according to claim 1, where the virtual delay is relative to a real-time clock.

3. The method according to claim 2, where the real-time clock is provided by a GPS clock.

4. The method according to claim 1, where the first interactive processor-controlled device is at a first position and the second interactive processor-controlled device is at a second position, and the period of the virtual delay is associated with the distance between the first position and the second position.

5. The method according to claim 4, where the period of the virtual delay is also associated with a delay area.

* * * * *